US011639223B1

(12) United States Patent
Allwein et al.

(10) Patent No.: US 11,639,223 B1
(45) Date of Patent: May 2, 2023

(54) AIRBORNE RECOVERY OF UNMANNED AERIAL VEHICLES

(71) Applicant: General Atomics Aeronautical Systems, Inc., San Diego, CA (US)

(72) Inventors: Michael Joseph Allwein, San Luis Obispo, CA (US); Kevin David Koller, Ramona, CA (US); Ryan Bylard, San Diego, CA (US); Roy Hultenius, Encinitas, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 24 days.

(21) Appl. No.: 17/455,383

(22) Filed: Nov. 17, 2021

(51) Int. Cl.
*B64D 3/02* (2006.01)
*B64C 39/02* (2023.01)
*B64U 70/20* (2023.01)
*B64U 10/25* (2023.01)
*B64U 80/82* (2023.01)

(52) U.S. Cl.
CPC .............. *B64D 3/02* (2013.01); *B64C 39/024* (2013.01); *B64U 70/20* (2023.01); *B64U 10/25* (2023.01); *B64U 80/82* (2023.01)

(58) Field of Classification Search
CPC ... B64D 3/02; B64D 5/00; B64D 3/00; B64U 80/82; B64U 70/20; B64U 70/30; B64C 25/68; B64C 39/022
See application file for complete search history.

(56) References Cited

U.S. PATENT DOCUMENTS 2,464,073 A  3/1949  Cotton
3,013,743 A * 12/1961  Keeney ................... B64D 5/00
244/3

(Continued)

FOREIGN PATENT DOCUMENTS

CN    107933925    4/2018
CN    111776148    10/2020
WO    WO 2016/167849    10/2016

OTHER PUBLICATIONS

International Search Report and Written Opinion in PCT Application No. PCT/US2021/031510 dated Aug. 27, 2021, in 14 pages.

(Continued)

*Primary Examiner* — Richard G Davis
(74) *Attorney, Agent, or Firm* — Knobbe, Martens, Olson & Bear, LLP

(57) ABSTRACT

Features for in-flight recovery of an unmanned aerial vehicle (UAV). A towline may be deployed by a host aircraft in-flight to recover an in-flight target UAV. The towline or portion thereof may be oriented nearly vertical. The towline may have a fitting thereon. A capture mechanism on the target UAV may have one or more deployable flaps that engage with the near vertical towline and fitting. The flaps may stow to secure the target aircraft to the towline and fitting. The host aircraft may then retract the towline to pull in the target UAV to the host aircraft using a hoist system having a winch. A latching system located in a pylon of the host aircraft, which may be under a wing, may have a towline connector that engages with and secures the target UAV. The host aircraft may have multiple hoist systems for deployment and/or recovery of multiple target UAV's.

20 Claims, 28 Drawing Sheets

(56) References Cited

U.S. PATENT DOCUMENTS

| | | | |
|---|---|---|---|
| 3,207,480 | A | 9/1965 | Fulton, Jr. |
| 6,932,299 | B2 | 8/2005 | Beyerle et al. |
| 7,059,564 | B2* | 6/2006 | Dennis ...................... B64F 1/04 |
| | | | 244/110 G |
| 7,066,430 | B2 | 6/2006 | Dennis et al. |
| 7,097,137 | B2 | 8/2006 | McDonnell |
| 7,900,866 | B2 | 3/2011 | Kutzmann et al. |
| 8,074,931 | B2 | 12/2011 | Schroeder |
| 8,231,083 | B2 | 7/2012 | Kutzmann et al. |
| 8,991,793 | B1 | 3/2015 | Bernhardt |
| 10,246,189 | B2 | 4/2019 | Paunicka et al. |
| 10,589,859 | B2 | 3/2020 | Foo et al. |
| 11,008,102 | B2 | 5/2021 | Ryan et al. |
| 2005/0133665 | A1 | 6/2005 | Dennis et al. |
| 2007/0108345 | A1 | 5/2007 | McDonnell |
| 2013/0082137 | A1 | 4/2013 | Gundlach et al. |
| 2013/0320138 | A1* | 12/2013 | Dickson ................ B64F 1/029 |
| | | | 244/110 F |
| 2017/0349283 | A1 | 12/2017 | Paunicka et al. |
| 2018/0327093 | A1 | 11/2018 | Von Flotow et al. |
| 2021/0237901 | A1* | 8/2021 | von Flotow .............. B64F 1/02 |
| 2021/0354825 | A1* | 11/2021 | Koller ..................... B64D 3/02 |

OTHER PUBLICATIONS

International Search Report and Written Opinion in PCT Application No. PCT/US2021/059780, dated Jul. 7, 2022, in 19 pages.
International Search Report and Written Opinion for Application No. PCT/US2021/059766, dated Aug. 3, 2022, in 15 pages.
TE Connectivity Ltd., Rochester Cables, Engineered Cable Solutions for Harsh Environments, (2016)16 pages.
Rescue Hoist Model 44301, A Rugged, Reliable Rescue Hoist, collinaerospace.com/hoistandwinch, printed 2019 in 2 pages.
Rescue Hoist Model 42305 A Rugged, Reliable Rescue Hoist, collinaerospace.com/hoistandwinch, printed 2019 in 2 pages.
Rescue Hoist Model 42325/44314, A Rugged, Reliable Rescue Hoist, collinaerospace.com/hoistandwinch, printed 2019 in 2 pages.

* cited by examiner

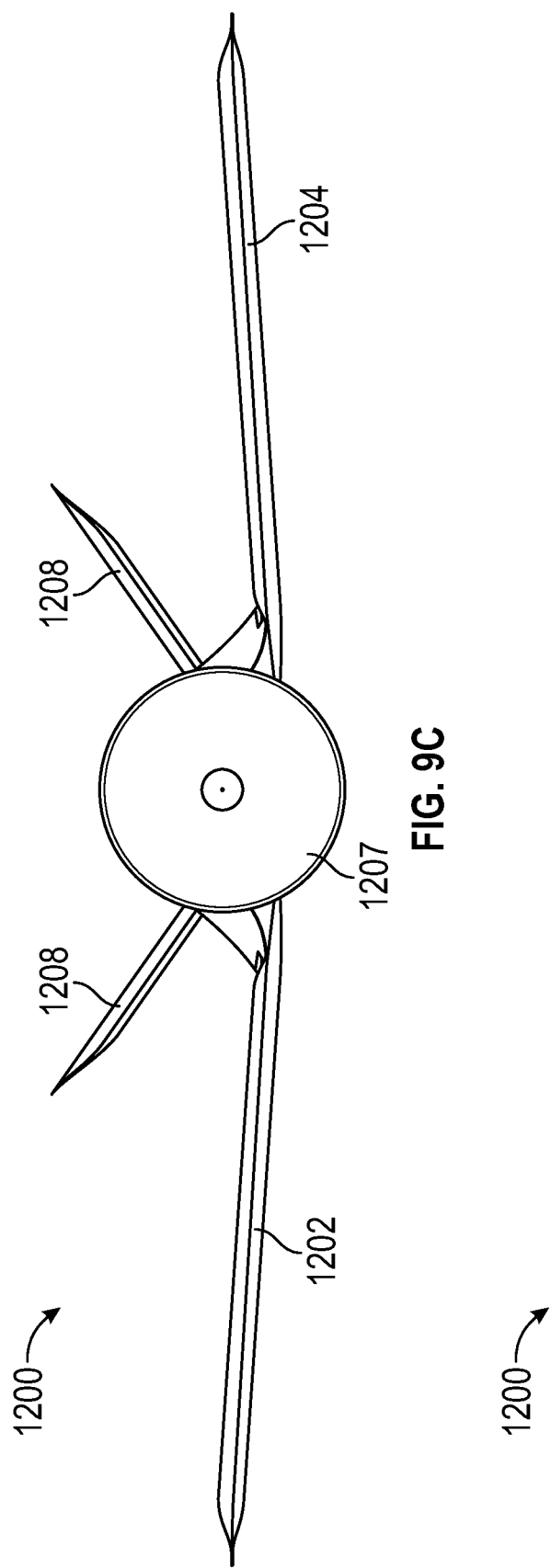
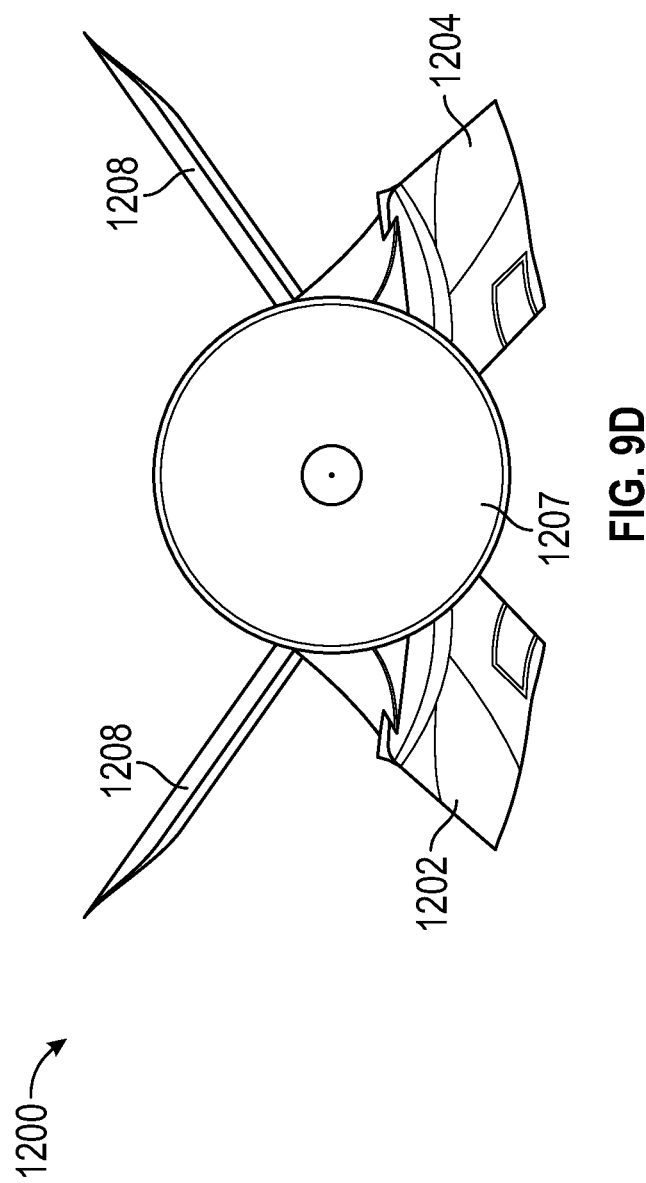

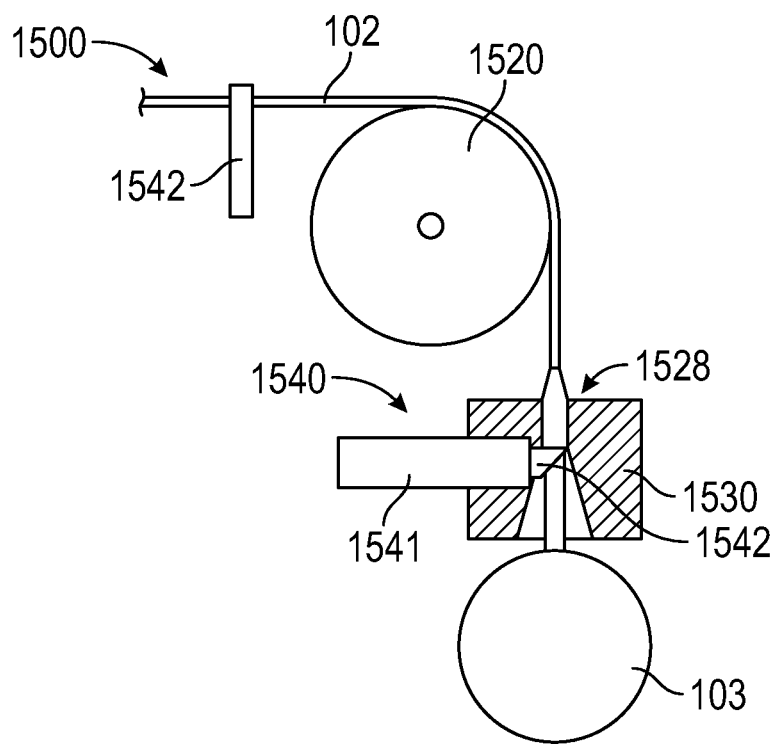
FIG. 14A
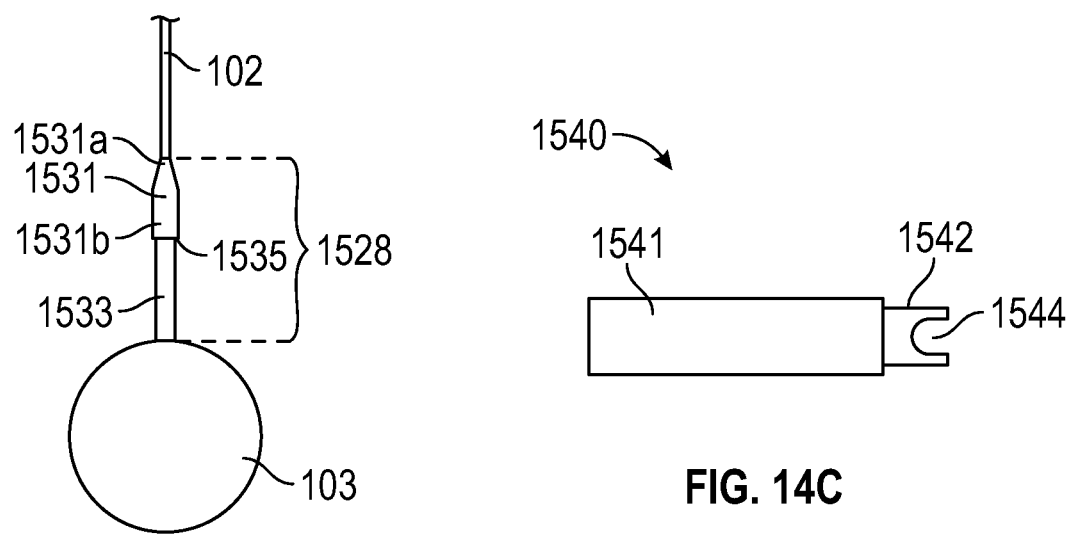
FIG. 14B
FIG. 14C

AIRBORNE RECOVERY OF UNMANNED AERIAL VEHICLES

STATEMENT REGARDING FEDERALLY SPONSORED RESEARCH OR DEVELOPMENT

The invention(s) herein may have been made with government support under Contract Number NEID-SC-0215-09 awarded by the U.S. Army Research Lab. The government may have certain rights in the invention(s).

BACKGROUND

Field

This disclosure relates generally to unmanned aerial vehicles (UAV's), in particular to systems and methods for recovery of an airborne UAV or other target aircraft by an airborne host aircraft.

Related Art

Unmanned aerial vehicles (UAV's) are aircraft that are piloted without a human pilot onboard. UAV's may be used for transport, surveillance, communications, weapons, and other uses. UAV's typically take off from the ground and return to the ground, which limits their versatility and usefulness. Recovery of UAV's or other aircraft in-flight may simplify missions and improve outcomes. Existing approaches to in-flight recovery are complex and unreliable. Improvements to these and other drawbacks are desirable.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for recovering unmanned aerial vehicles (UAV's) or other aircraft in flight.

The following disclosure describes non-limiting examples of some embodiments. Other embodiments of the disclosed systems and methods may or may not include the features described herein. Moreover, disclosed advantages and benefits may apply only to certain embodiments of the invention and should not be used to limit the disclosure.

Features for airborne recovery of an unmanned aerial vehicle (UAV). A towline may be deployed by a host aircraft in-flight in order to recover a target UAV that is also in-flight. The towline or a portion thereof may be oriented nearly vertical. The towline may have a fitting thereon. A capture mechanism on the target UAV may have one or more moveable portions such as deployable flaps that deploy and engage with the fitting on the near vertical towline. The flaps may stow to secure the target aircraft to the towline and fitting. The host aircraft may then retract the towline to pull in the target UAV to the host aircraft using a hoist system having a winch. A latching system located in a pylon of the host aircraft, which may be under a wing, may have a latch housing that secures with a towline connector coupled with the towline end fitting and that engages with and secures the target UAV. The host aircraft may have multiple hoist systems for deployment and/or recovery of multiple target UAV's.

Disclosed herein are embodiments of a system for recovery of a target aircraft by a host aircraft during forward flight that can include a towline including a proximal section configured to be coupled with the host aircraft and a distal section configured to be paid out from the host aircraft, a fitting coupled with the distal section of the towline, and a capture mechanism including a first movable portion and a second movable portion configured to be coupled with a fuselage of the target aircraft.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein the first movable portion of the capture mechanism can be configured to move from a first position to a second position in which the first movable portion extends away from the fuselage of the target aircraft; wherein the second movable portion of the capture mechanism can be configured to move from a first position to a second position in which the second movable portion extends at an angle away from the fuselage of the target aircraft; wherein the capture mechanism can be configured to receive the towline in an opening defined by the first and second movable portions in the second positions and to permit vertical movement of the towline through the opening; wherein the capture mechanism can be configured to prevent the fitting attached to the towline from moving vertically through the opening; wherein, in the first position, the first and second movable portions can be positioned near the fuselage, in line with the fuselage, or against the fuselage of the target aircraft; wherein the first and second movable portions can be configured to move to a capture position, or return to respective first positions, to secure the target aircraft to the towline; wherein the opening can be smaller than a maximum cross-sectional size of the fitting; wherein the first movable portion and the second movable portion can be configured to rotate between the respective first and second positions; wherein the first movable portion of the capture mechanism can be configured to move independent of the position of the second movable portion; wherein the first movable portion can be integral with or rigidly attached to the second movable portion such that the first and second movable portions move together as one unit between the first and second positions; wherein the capture mechanism can be configured to receive the towline in the opening with the distal section of the towline oriented less than 30 degrees off a vertical direction; and/or wherein the host aircraft includes a system for securing a target aircraft to a host aircraft, the system including a winch configured to be supported by a wing of the host aircraft and to have a deployable towline carried by the winch, one or more fleet pulleys, the towline configured to extend from the winch through the one or more fleet pulleys, an upper sheave, the towline configured to extend from the fleet pulley to the upper sheave, and a towline connector, the towline configured to extend below the aircraft and be reeled in by the winch to secure the target aircraft with the host aircraft.

Also disclosed herein are embodiments of a system for recovery of a target aircraft by a host aircraft during forward flight, wherein the system can include a wing root region defined by an intersection of a wing and a fuselage of the target aircraft, the wing root region configured to receive from the host aircraft a towline having a fitting, one or more flaps configured to be moveably coupled with the fuselage, and one or more actuators configured to deploy the one or more flaps to a deployed position away from the fuselage. In some embodiments, the one or more flaps can define an opening configured to receive the towline therein, such that the fitting contacts the one or more flaps in response to relative vertical movement between the towline and the one or more flaps in the deployed position, and the one or more actuators can be further configured to stow the one or more flaps to a stowed position to secure the fitting and towline with the target aircraft.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein, in the stowed position, the one or more flaps form an outer surface of the fuselage; wherein the one or more flaps include a first flap and a second flap; wherein the first and second flaps can be independently movable; wherein the fitting has a width greater than a width of the opening defined by the one or more flaps; wherein the one or more flaps can be configured to prevent the fitting from moving in an upward direction relative to the one or more flaps when the fitting has been moved into contact with the one or more flaps; and/or wherein the one or more flaps can be configured to receive the towline in the opening with at least part of the towline adjacent the fitting oriented less than 30 degrees off the vertical direction.

Also disclosed herein are embodiments of a method of recovering a target aircraft with a host aircraft during forward flight, wherein the method can include extending from the host aircraft a towline having a fitting, positioning the towline within a wing root region of the target aircraft with at least part of the towline oriented less than 30 degrees off a vertical direction, deploying one or more flaps from a fuselage of the target aircraft, positioning the towline within an opening defined by the one or more flaps in the deployed position, causing relative vertical movement between the one or more flaps and the towline to move the fitting near the one or more flaps, and stowing the one or more flaps with the fuselage to secure the target aircraft to the towline.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: further including retracting the towline into the host aircraft to move the target aircraft toward the host aircraft; wherein deploying the one or more flaps includes deploying a first flap and a second flap; and/or wherein the first and second flaps can be deployed independently of each other.

Also disclosed herein are embodiments of a system for securing a target aircraft to a host aircraft that can include a pylon attached to an underside of a wing of the host aircraft, a motorized winch supported within the pylon and having a towline carried by the winch, the winch configured to pay out and reel in the towline, a plurality of fleet pulleys supported within the pylon, the towline extending from the winch through the plurality of fleet pulleys, an upper sheave supported within the pylon, the towline extending from the fleet pulleys and around the upper sheave, and a towline connector on the towline. In some embodiments, the towline can be configured to extend from the upper sheave and exit the aircraft. An end fitting can be positioned on a distal end of the towline near the towline connector. The distal end of the towline can be configured to orient less than thirty degrees off a vertical direction for attachment of the end fitting with a target aircraft. The motorized winch can be configured to reel in the towline and target aircraft to secure the towline connector with the host aircraft.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein the plurality of fleet pulleys include two pulleys oriented approximately horizontally; wherein the upper sheave can be oriented vertically; further including a latch housing configured to secure the towline connector; wherein the winch includes a cartridge through which the towline extends, the cartridge movable along an axle, such that a portion of the towline between the winch and the plurality of fleet pulleys may sweep a total angle of at least thirty degrees; further including one or more sway bars attached to an underside of the pylon and configured to laterally stabilize the secured target aircraft; wherein the one or more sway bars each extend laterally outward and downward from the pylon; further including a bottom sheave configured to guide vertical movement of the towline connector; and/or wherein the target aircraft includes one or more flaps configured to deploy and stow, wherein the flaps deploy to define an opening through which the towline is received, and wherein the flaps stow to guide the end fitting into a recess of the target aircraft.

Also disclosed herein are embodiments of a system for securing a target aircraft to a host aircraft that can include a winch configured to be supported by a wing of the host aircraft and to have a deployable towline carried by the winch, one or more fleet pulleys, the towline configured to extend from the winch through the one or more fleet pulleys, an upper sheave, the towline configured to extend from the fleet pulley to the upper sheave, and a towline connector on the towline configured to secure with the host aircraft, the towline configured to extend below the host aircraft and be reeled in by the winch to secure the target aircraft with the host aircraft.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein the towline is configured to have a fitting on the towline to attach to the target aircraft; wherein a portion of the towline can be configured to be oriented less than thirty degrees off a vertical direction; further including a pylon attached to a wing of the host aircraft, the pylon supporting the winch; wherein the one or more fleet pulleys include first and second fleet pulleys oriented horizontally; wherein the upper sheave can be oriented vertically; further including a latch housing, wherein the towline connector can be configured to move up and down between a plurality of vertical positions, and wherein the latch housing can be configured to secure the towline connector at one or more of the plurality of vertical positions; and/or wherein the target aircraft includes one or more flaps configured to deploy and stow, wherein the flaps deploy to define an opening through which the towline can be received, and wherein the flaps stow to guide the end fitting into a recess of the target aircraft.

Also disclosed herein are embodiments of a method of securing a target aircraft to a host aircraft that can include deploying a towline from a winch, stabilizing the towline as it exits the winch, guiding the towline downward to cause the towline to exit the host aircraft, reeling in the towline using the winch after the towline has secured with the target aircraft, stabilizing the target aircraft under a wing of the host aircraft, and operating a latching system to secure the target aircraft with the host aircraft. In some embodiments, operating the latching system can include securing a towline connector of the towline to prevent the towline connector from movement vertically downward. In some embodiments, stabilizing the towline can include guiding the towline through a fleet pulley assembly.

In another aspect, a system for in-flight recovery of a target aircraft by a host aircraft during forward flight is described. The system may include a hoist or reel, a towline, and a capture mechanism. The reel is configured to attach with the host aircraft. The towline comprises an aft section with a fitting attached to the aft section, where the reel is configured to pay out the towline from the reel to extend the fitting away from the host aircraft during forward flight. The capture mechanism is configured to attach with the target aircraft and to transition from a first configuration to a second configuration. The capture mechanism is configured to capture the towline and/or a fitting thereof with the towline in a near-vertical orientation, e.g. less than 30 degrees relative to a vertical direction. In some embodiments, the capture mechanism can be configured to capture the towline and/or a fitting thereof with the towline at less than 45 degrees relative to a vertical direction. The towline may initially be greater than 30 degrees but the re-orient to be less than 45 or 30 degrees, etc.

In another aspect, a system for in-flight recovery of a target aircraft by a host aircraft during forward flight is described. In some embodiments, the system may include a towline that may include a proximal section configured to be coupled with a host aircraft and a distal section configured to be paid out from the host aircraft, a fitting coupled with the towline, and a capture mechanism that may include a first movable portion and a second movable portion configured to be coupled with or integral to a fuselage of the target aircraft. In any embodiments disclosed herein, the first movable portion of the capture mechanism may be configured to move between a first position in which the first movable portion is positioned in line with or against the fuselage of the target aircraft and a second position in which the first movable portion extends at an angle away from the fuselage of the target aircraft. Further, in any embodiments disclosed herein, the second movable portion of the capture mechanism may be configured to move between a first position in which the second movable portion is positioned in line with or against the fuselage of the target aircraft and a second position in which the second movable portion extends at an angle away from the fuselage of the target aircraft and the capture mechanism may be configured to receive the towline in an opening in the capture mechanism at least when the first and second movable portions are in the second position and to permit a movement of the towline through the opening in the capture mechanism until the fitting attached to the towline has moved into engagement with the capture mechanism. In any embodiments disclosed herein, the first and second movable portions may be configured to move to the first position to further restrain the fitting attached to the towline after the fitting has been moved into engagement with the first and second movable portions.

Further, any aspects or embodiments of the methods, devices and systems for in-flight recovery of a target aircraft by a host aircraft or the embodiments of the capture mechanisms disclosed herein may include, in additional embodiments, one or more of the following steps, features, components, and/or details, in any combination with any of the other steps, features, components, and/or details of any other embodiments disclosed herein: wherein the capture mechanism may be configured such that the towline cannot continue to be withdrawn through the opening in the capture mechanism when the fitting is in contact with an underside surface of the first and second movable portions; wherein the opening is smaller than a maximum cross-sectional size of the fitting; wherein the first and second movable portions may be configured to prevent the fitting from moving in an upward direction relative to the capture mechanism when the target aircraft is in an operable state and when the fitting has been moved into contact with an underside surface of the first movable portion and an underside surface of the second movable portion; wherein the first movable portion and the second movable portion may be configured to rotate between the first and second positions; wherein the opening is a space between the first and second movable portions; wherein the first movable portion of the capture mechanism may be configured to move between the first and second positions independent of the position of the second movable portion; wherein the fitting has body portion having a conical shape; and/or wherein the system may include a hoist configured to be integrated into or attached to the host aircraft and configured to draw out or withdraw the towline.

In another aspect, a capture mechanism for an unmanned aircraft is described. In some embodiments, the capture mechanism may include a first movable portion and a second movable portion configured to be coupled with or integral to a fuselage of the target aircraft and configured to capture and secure a towline to the target aircraft. In any embodiments, the first movable portion of the capture mechanism may be configured to move between a first position in which the first movable portion is configured to be positioned in line with or against the fuselage of the target aircraft and a second position in which the first movable portion is configured to extend at an angle away from the fuselage of the target aircraft. In any embodiments, the second movable portion of the capture mechanism may be configured to move between a first position in which the second movable portion is configured to be positioned in line with or against the fuselage of the target aircraft and a second position in which the second movable portion configured to extend at an angle away from the fuselage of the target aircraft. Some embodiments of the capture mechanism may be configured to receive a towline in an opening in the capture mechanism at least when the first and second movable portions are in the second position and configured to permit a movement of the towline through the opening in the capture mechanism until a fitting attached to the towline has moved into contact with the capture mechanism. In some embodiments, the first and second movable portions may be configured to move to the first position to further restrain the fitting attached to the towline after the fitting has been moved into engagement with the first and second movable portions.

Any embodiments of the methods, devices and systems for in-flight recovery of a target aircraft by a host aircraft or the embodiments of the capture mechanisms disclosed herein may include, in additional embodiments, one or more of the following steps, features, components, and/or details, in any combination with any of the other steps, features, components, and/or details of any other embodiments disclosed herein: wherein the capture mechanism may be configured such that a towline cannot continue to be withdrawn through the opening in the capture mechanism when a fitting attached to the towline is in contact with an underside surface of the first and second movable portions; wherein the opening is smaller than a maximum cross-sectional size of the fitting; wherein the first and second movable portions may be configured to prevent the fitting from moving in an upward direction relative to the capture mechanism when the fitting has been moved into contact with an underside surface of the first and second movable portions; wherein the first movable portion and the second movable portion may be configured to rotate between the first and second positions; wherein the opening is a space between the first and second movable portions; and/or wherein the first movable portion of the capture mechanism may be configured to move between the first and second positions independent of the position of the second movable portion.

In another aspect, a method of capturing a target aircraft in flight is described. In any embodiments disclosed herein, the method of capture a target aircraft may include maneuvering a target aircraft having a capture mechanism may include a first movable portion and a second movable portion toward a towline from a host aircraft so that the towline is directed to a wing root on the target aircraft, positioning at least a leading edge of the second movable portion aft of the towline by moving the second movable portion to a second position in which the second movable portion extends away from the fuselage of the target aircraft and is positioned aft of the towline, positioning at least a trailing edge of the first movable portion forward of the towline by moving the first movable portion to a second position in which the first movable portion extends away from the fuselage of the target aircraft and is positioned forward of the towline, causing upward vertical movement of the towline relative to the target aircraft to move a fitting on the towline in contact with the first and second movable portions, moving the first and second movable portions to a first position of the first and second movable portions to prevent the fitting from moving away from the first and second movable portions, and/or withdrawing the towline to move the target aircraft toward the host aircraft.

Any embodiments of the methods, devices and systems for in-flight recovery of a target aircraft by a host aircraft or the embodiments of the capture mechanisms disclosed herein may include, in additional embodiments, one or more of the following steps, features, components, and/or details, in any combination with any of the other steps, features, components, and/or details of any other embodiments disclosed herein: wherein the first or second movable portions are approximately in line with or adjacent to a fuselage of the target aircraft in the first position of the first and second movable portions; may include moving the second movable portion to the second position before moving the first movable portion to the second position, wherein the second movable portion is aft of the first movable portion; may include moving the first and second movable portions to the second position simultaneously; wherein the first movable portion is integral with the second movable portion; and/or wherein the method may further include securing the target aircraft to the host aircraft.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, may be arranged, substituted, combined, and designed in a wide variety of different configurations, all of which are explicitly contemplated and make part of this disclosure.

FIGS. 9A-9D are various views of the target aircraft of FIGS. 8A-8C showing the target aircraft wings in deployed and stowed positions.

FIG. 14A is a side view of a schematic of an embodiment of a latching system that may be used with the hoist systems of FIGS. 8A-8C.

FIG. 14B is a side view of a portion of the embodiment of the towline, towline connector, and end fitting as shown in FIG. 14A.

FIG. 14C is a top view of the embodiment of the latch assembly shown in FIG. 14A.

DETAILED DESCRIPTION

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Figure 1:
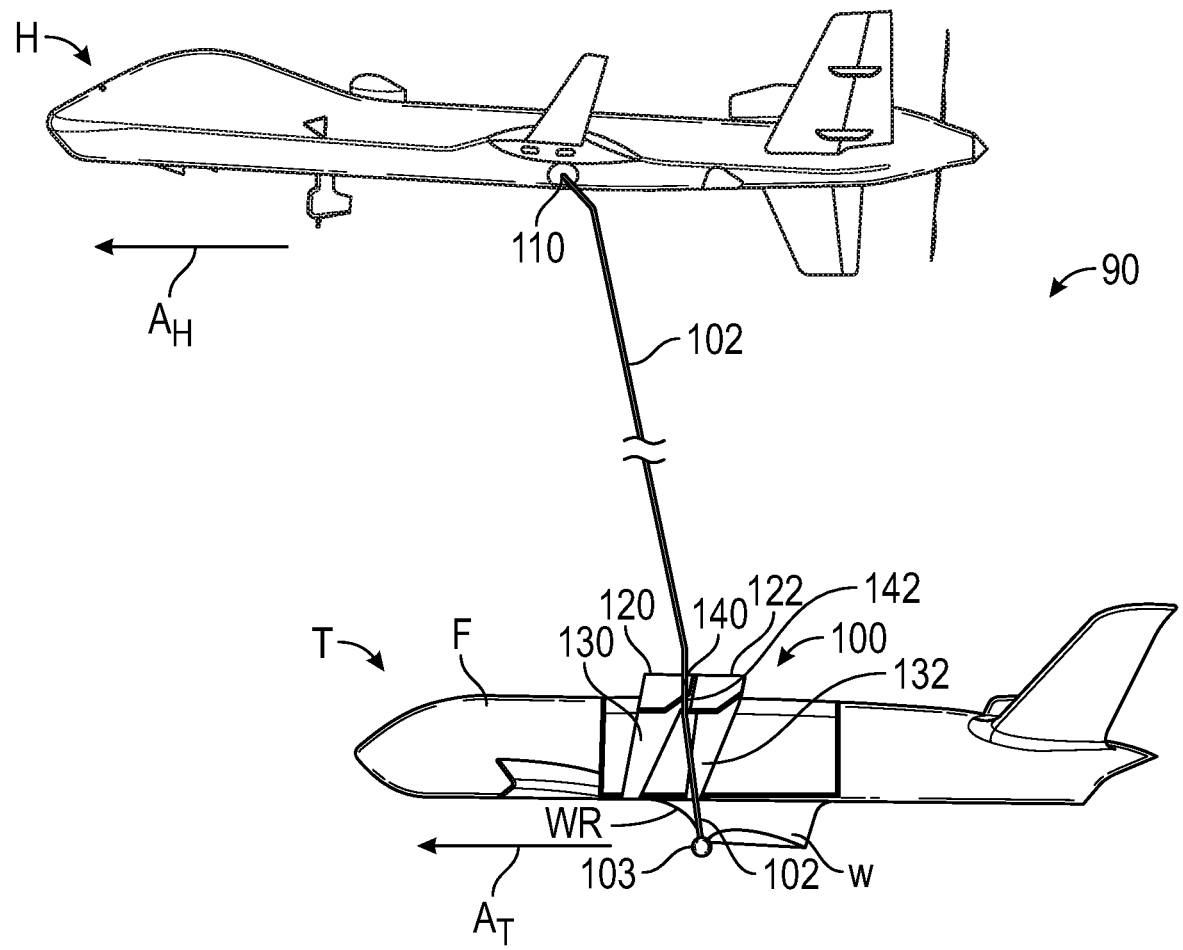
FIG. 1 shows a side view of an embodiment of a system for recovery of a target aircraft by a host aircraft.

FIG. 1 depicts an embodiment of a system 90 for airborne or in-flight recovery of a target aircraft T having a capture mechanism 100, using a towline from a host aircraft H. Some embodiments disclosed herein include an improved capture mechanism and system for unmanned aerial vehicles (UAV's) or other target aerial vehicles (collectively, target aerial vehicle or vehicles or target aircraft) for capturing a towline tethered to a host aircraft. For clarity, in FIG. 1 the host aircraft H, towline 102, and the target aircraft T are not necessarily to scale. The host aircraft H may be any type of manned or unmanned aircraft. The host aircraft H may be a conventional aircraft such as a jet or prop-driven aircraft, UAV, or other aircraft type. The target aircraft T may be any type of UAV, although the target aircraft T may also be a manned or piloted aircraft in any embodiments disclosed herein. The host and/or target aircraft H, T in any embodiments disclosed herein may be forward flying aircraft. In some embodiments, one or both of the host and target aircraft H, T may be in vertical flight, such as a vertical takeoff and landing (VTOL) aircraft, helicopter, or other types of aircraft.

UAV's are aircraft without a human pilot onboard. UAV's may be piloted manually by a remote operator and/or through autonomous or semi-autonomous controls. The remote operator may pilot the UAV based on the UAV's flight cameras, gauges, and other control sensors. The target aircraft T may be a UAV with a fuselage F, one or more flight surfaces, such as wings W, extending outwardly from the fuselage, and a propulsion system, such as a combustion or electric engine. UAV's may be used in a number of roles, such as aerial reconnaissance and ground surveillance, monitoring terrestrial objects and people, scientific experiments, geological surveys, military or non-military contexts, weapon delivery, and others.

Larger aircraft may generally have greater operable ranges than smaller or lighter UAV's. Thus, carrying a UAV on the host aircraft H and launching therefrom may expand the useful range of the UAV. However, safely landing the UAV for terrestrial recovery may be difficult or impossible in certain circumstances. For example, the geography may lack sufficient landing space, or the landing spaces may be in undesirable locations (e.g., under enemy control). Moreover, existing methods of aerial recovery of UAV's are impractical and unreliable. Accordingly, a need exists for the reliable recovery of a UAV in-flight.

Some embodiments disclosed herein include a capture mechanism to enable airborne recovery of a wide range of small, unmanned air vehicles or other target aircraft T in flight using the towline 102 with a simple, passive end feature or fitting deployed from the host aircraft H. Some embodiments of the capture mechanism on the target aircraft may be scalable and/or tunable to conform to a wide range of airframe shapes and sizes. In some embodiments, the components and methods of capture employ existing airframe features (e.g. leading or trailing edge of wing, left or right hand side of fuselage) to funnel or bias the towline 102 to the capture mechanism. Using these relatively large airframe features as a towline funnel or guide increases reliability and leads to very high probability of recovery, even for a small UAV with poor or moderate flight control.

Once the target aircraft T captures the towline fitting, some embodiments of the target aircraft T may be transitioned to a passively stable towed body by retracting or rotating its wings and reducing or stopping thrust. In some embodiments, the host aircraft H may use a hoist system in a pod on or in the host aircraft H to reel-in the target aircraft T (e.g. as shown in FIGS. 8A-14). The target aircraft T may be refueled or recharged by the host aircraft H and sent on a subsequent sortie, have maintenance performed on the target aircraft T, be transported to a mission point via captive carriage on the host aircraft H where the target aircraft T may be launched, or other actions taken. In some embodiments, the target aircraft T may conduct its mission and then be recovered by the host aircraft H. The host aircraft H may then transport the target aircraft T back to base for service (e.g. refuel, rearm, maintenance, etc.). Or, such maintenance, refueling, rearming, etc., may be provided to the target aircraft T while attached to the host aircraft H so that the target aircraft T may be launched or re-launched from the host aircraft H for another mission without having to return to base. Some embodiments of the capture mechanisms disclosed herein use a simple towline and hoist and may be used for capturing a very broad array of small UAV's (e.g. different airframe shapes, propulsion types, propulsion locations, etc.). Some embodiments of the capture mechanisms disclosed herein may be integrated into the fuselage during manufacturing of the UAV's and/or may be retrofit to existing fuselages of UAV's.

Existing solutions for in-flight recovery of aircraft are complex and unreliable. Today, some small UAV's may be very limited in their range and utility. Recovery of UAV's using conventional methods (e.g. skid landing or net arrest) risks significant damage. This precludes them from carrying expensive, advanced sensors and other equipment. The recovery systems according to the present disclosure provide reliable airborne approaches that may overcome these drawbacks. The host aircraft H may transport a small UAV or other target aircraft T long distances to a mission point. With little risk of damage to the target aircraft T upon recovery, small UAV's may carry expensive, advanced sensors with less risk of damage to such sensors. Therefore, providing reliable, robust systems for recovering UAV's has significant benefits. The capture mechanism 100 with deployable flaps and using the wing root as a guide for the near-vertical towline 102, among other features of the present disclosure described herein, provide such enhanced reliability and robustness and in a simpler recovery process.

As further shown in FIG. 1, the capture mechanism 100 may be coupled with or integrally formed with a portion of the target aircraft T, such as the fuselage F as shown. The target aircraft T may be traveling in a horizontal direction. The direction of travel is indicated by arrow $A_T$. The capture mechanism 100 may be configured to capture the towline 102 tethered to the host aircraft H while traveling in a horizontal direction, indicated by arrow $A_H$, which may be the same or similar direction as the direction $A_T$ of the target aircraft T. "Horizontal" as used herein has its usual and customary meaning and includes, without limitation, directions perpendicular to the direction of gravity, and directions that are approximately perpendicular to the direction of gravity, for example within +/−5 degrees, +/−10 degrees, +/−20 degrees, or +/−30 degrees of horizontal. The host and target aircraft H, T may be in horizontal or forward flight, and includes any aircraft or flying machine intended to fly horizontal. In some embodiments, the host aircraft H and/or target aircraft T may be flying only vertically, both horizontally and vertically, or they may be stationary in-flight without horizontal or vertical movement.

The target aircraft T in any of the embodiments disclosed herein may be any suitable or desired aerial vehicle. For example and without limitation, the target aircraft T shown in FIGS. 1 and 2A-2K may be a Sparrowhawk Small Unmanned Aircraft System (SUAS), by General Atomics Aeronautical Systems, Inc. In other embodiments disclosed herein, the target aircraft T may be any suitable or desired vertical lift aircraft, or any other suitable or desired manned or unmanned aircraft. The host aircraft H may be an MQ-9 or other aircraft. The target aircraft T may have a deployed-wing wingspan of between 2 to 75 feet (ft), between 3 and 50 ft, between 4 and 25 ft, or between 5 and 15 ft. The target aircraft T may have a length of between 3 and 50 ft, between 3 and 25 ft, between 3 and 15 ft, or between 3 and 10 ft. The target aircraft T may have a weight of between In some embodiments, the host aircraft H may be include a hoist 110. The hoist 110 may include a winch. The hoist 110 may have some or all of the same or similar features and/or functions as the hoist system 1300 described with respect to FIGS. 8A-14, and vice versa. The hoist 110 may be configured to pay out or release the towline 102 and may be configured to reel in the towline 102, which may be done after the towline 102 has been captured by the target aircraft T. In this manner, the host aircraft H may tether the target aircraft T and move the target aircraft toward the host aircraft H. The hoist 110 may be attached to the fuselage and/or to the wing of the host aircraft H. In some embodiments, the hoist 110 may be an electric hoist. The host aircraft H may have some or all of the same or similar features and/or functions as the host aircraft 1100 described with respect to FIGS. 8A-14, and vice versa.

With reference to FIG. 1, the capture mechanism 100 may include a first movable portion 120 and second movable portion 122, such as arms or flaps. The first and second movable portions 120, 122 may be configured to rotate or move between a first stowed position in which the movable portion is in a closed or stowed state, and a second deployed position in which the movable portion is in an open or extended position. In FIG. 1, the movable portions 120, 122 are shown in deployed positions.

The towline 102 is shown extended downward with a portion 142 of the towline 102 located between a space 140 defined by the movable portions 120, 122. The towline 102 further extends through a wing root WR in front of the wing W and adjacent the fuselage F, which may be a region adjacent the aircraft, as further described. A fitting 103 is located on a distal end of the towline 102, which may be at the end of the towline 102 as shown. In some embodiments, there may be some length of the towline 102 extending beyond, e.g. through and beyond, the fitting 102. The wing root WR and movable portions 120, 122 may guide the towline into the space 140 to then stow the movable portions 120, 122 and thereby capture the fitting 103, as further described. The fitting 103 may be spherical as shown, or other shapes, as further described herein for example with respect to FIGS. 7A-7H.

The movable portions 120, 122 may be elongated arms or flaps. The movable portions 120, 122 may be made of metal, composite, other suitable materials, or combinations thereof. The movable portions 120, 122 may each have a thickness that is less than a width or average width. The length of each movable portion 120, 122 may be greater than the width and/or thickness. The movable portions 120, 122 may have a variety of shapes, sizes, and configurations, such as prongs, poles, bars, members, or any other structure that may operate to secure the fitting 103 to the target aircraft T as described herein.

In some embodiments, the first and/or second movable portions 120, 122 may have a contour that is rounded. The contour of the movable portions 120, 122 may match a contour of the fuselage of the target aircraft T, for example to optimize the aerodynamics of the capture mechanism 100 and the target aircraft T when the first and second movable portions 120, 122 are in the closed position. The movable portions 120, 122 may be configured to reduce the aerodynamic drag of the capture mechanism 200 when the first and second movable portions 220, 222 are in the first and second positions. For example, the movable portions 120, 122 may be made from a thin sheet metal or other rigid material.

The movable portions 120, 122 may move between various positions. For example, as shown in FIG. 2F, the first movable portion 120 is shown in a first position where it is closed or stowed in line with the fuselage, and the second movable portion 122 is shown in the second position where it is open or deployed. In some embodiments, the first and second movable portions 120, 122 may be configured to move independently of one another—e.g., the first movable portion 120 may be moved independently of the second movable portion 122 and the second movable portion 122 may be moved independently of the first movable portion 120. In some embodiments, first and second movable portions 120, 122 may be connected and/or configured to move simultaneously and/or equal amounts. In some embodiments, there may be three, four, or more movable portions. Further, the movable portions 120, 122 may move to any positions that are between the deployed and stowed positions, such as partially deployed positions, half-deployed positions, etc.

The capture mechanism 100 may have a first recess 130 (see FIGS. 1, 2F and 2G) configured to receive the first movable portion 120 therein when the first movable portion 120 is in the closed position. The capture mechanism 100 may have a second recess 132 (see FIGS. 1, 2F and 2G) configured to receive the second movable portion 122 therein when the second movable portion 122 is in the closed position. The recesses 130, 132 may be different portions of one single, larger recess. The recesses 130, 132 may be openings or spaces in the fuselage F.

Figure 2A:
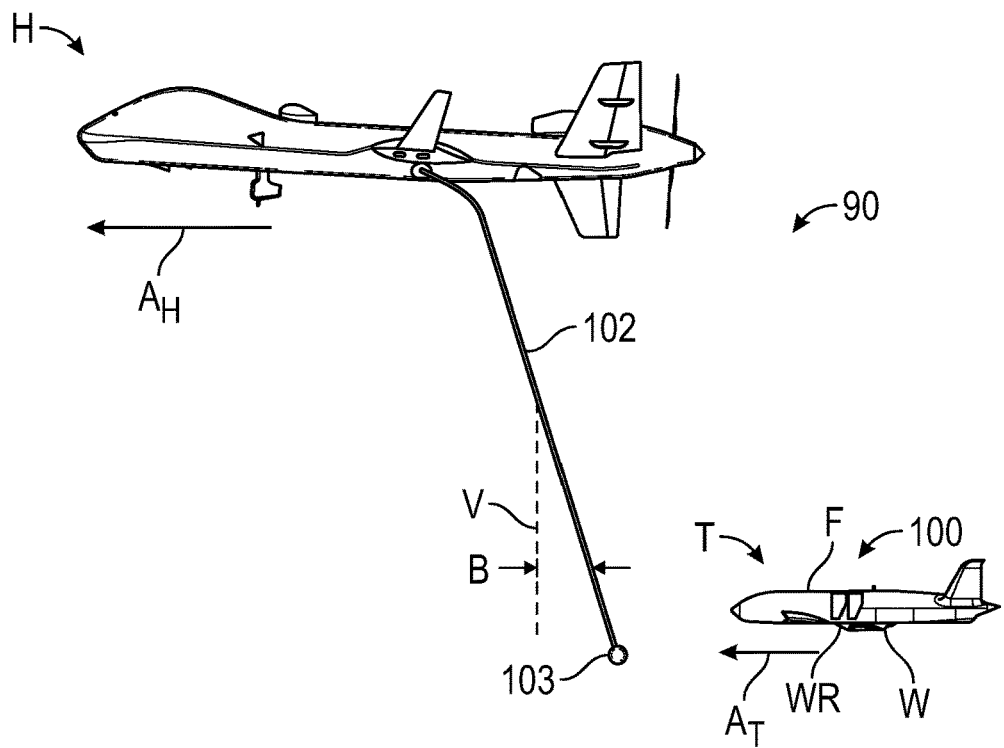
FIGS. 2A-2K show sequential side views of a host and target aircraft in-flight illustrating an embodiment of a method of recovering the target aircraft using the recovery system shown in FIG. 1.
Figure 2B:
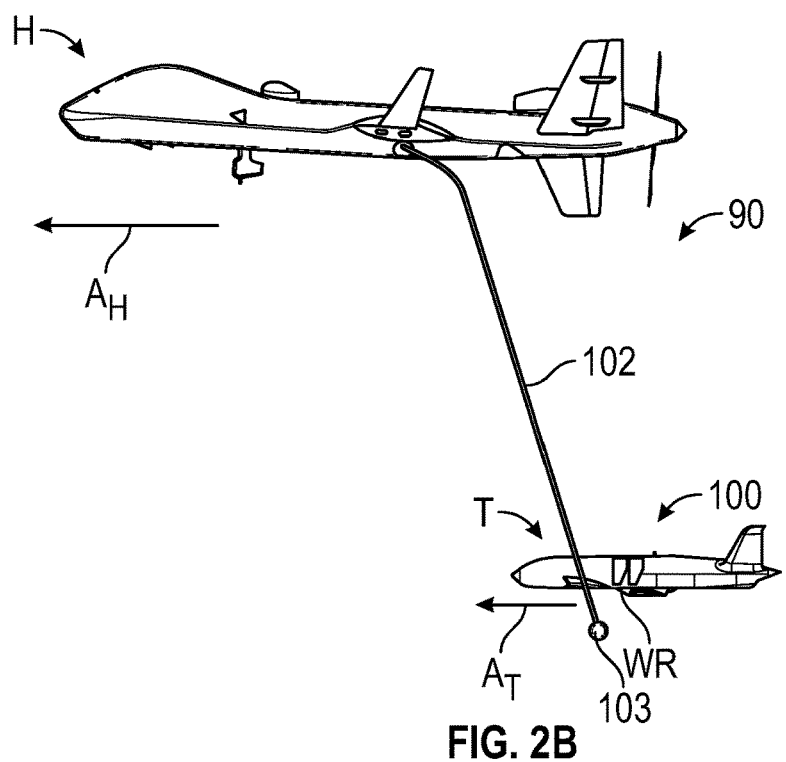
Figure 2C:
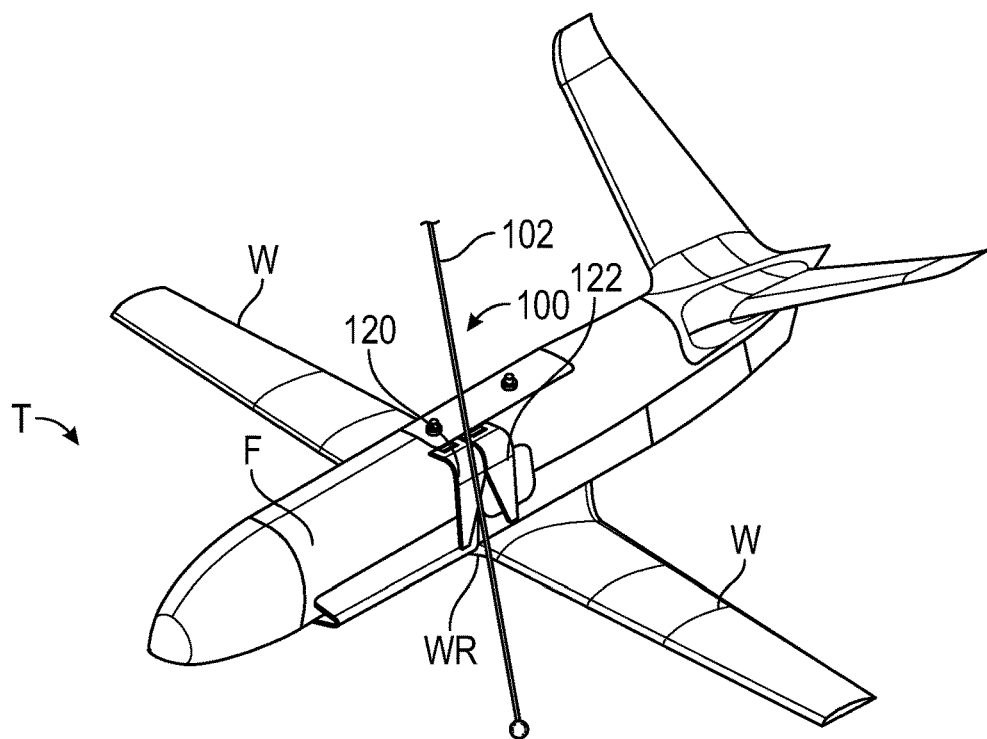
Figure 2D:
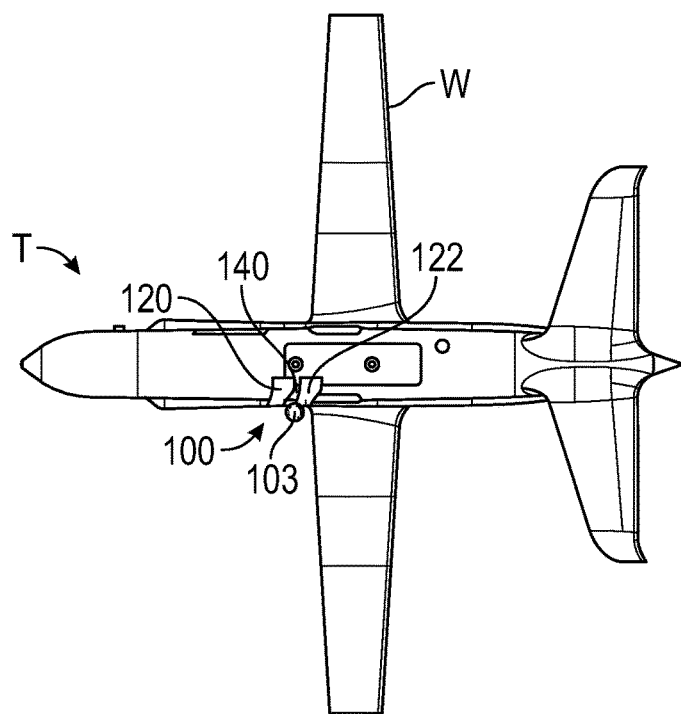
Figure 2E:
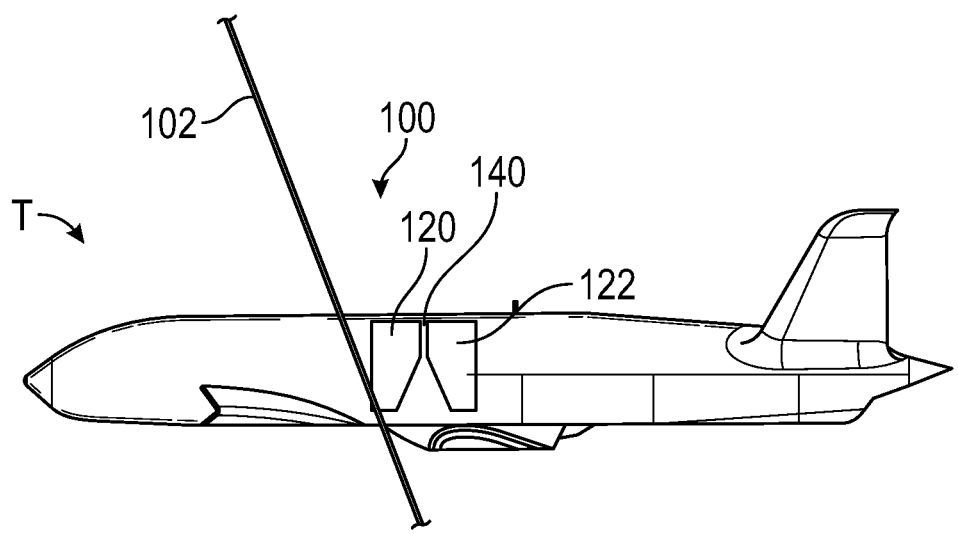
Figure 2F:
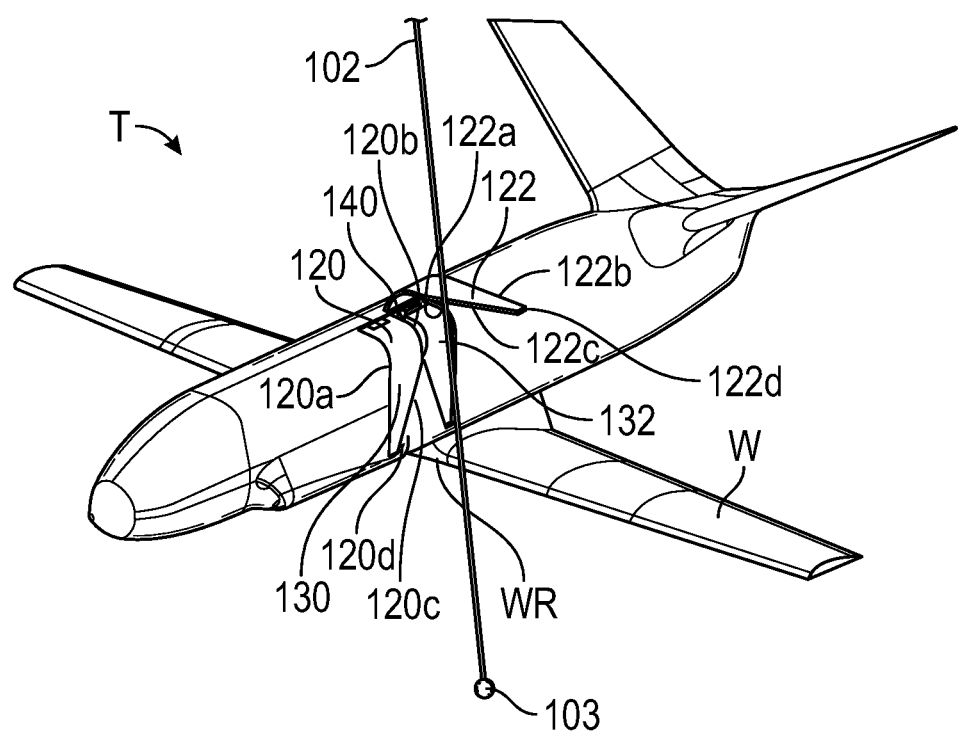
Figure 2G:
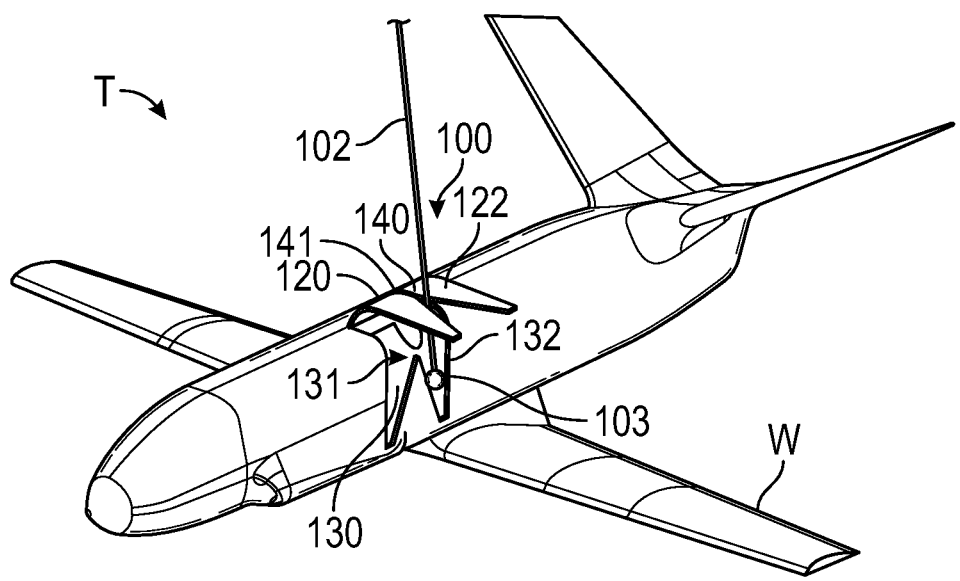

The capture mechanism 100 may have or define a cavity 131, as shown for example in FIG. 2G. The cavity 131 may be located underneath the stowed movable portions 120, 122. The cavity may be an open or empty space which receives the fitting 103 and part of the towline 102. The movable portions 120, 122 in the stowed positions close over the cavity 131 with the fitting 103 and part of the towline 102 therein to secure to the towline 102 to the target aircraft T. The recesses 130, 132 may form an outer portion of the cavity 131.

As shown in FIG. 2F, the first movable portion 120 may have a straight leading or forward edge 120a and an opposite aft or trailing edge 120b. The first movable portion 120 may have a lower or outer edge 120d at a distal end of the first movable portion 120. The first movable portion 120 may have a rearward edge 120c, which may be angled as shown. The rearward edge 120c may be adjacent to the aft or trailing edge 120b. The rearward edge 120c may extend from the outer edge 120d to the aft edge 120b. The rearward edge 120c may be configured to guide or bias the towline 102 to a space 140 (also referred to as an opening or a gap) between the first and second movable portions 120, 122. The second movable portion 122 may have a leading edge 122a and an opposite, straight aft or trailing edge 122b. An angled forward edge 122c may extend from the leading edge 122a to a lower or outer edge 122d. The angled rearward edge 120c of the first movable portion and the angled forward edge 122c of the second movable portion 122 may face each other and partially define an outer receiving portion of the opening 140. The opening 140 may thus decrease in width in the direction of the target aircraft T. The straight aft edge 120b of the first movable portion 120 and the straight leading edge 122a of the second movable portion 122 may face each other and partially define an inward securing portion of the opening 140. The opening 140 may thus have a constant width between the straight aft edge 120b and the straight leading edge 122a. The towline 102 may be guided into the decreasing width portion of the opening 140 and then into the constant width portion of the opening 140, as further described.

With reference to FIGS. 2A-2K, sequential views of an embodiment of the recovery system 90 are shown illustrating a method of capturing the target aircraft T having the capture mechanism 100 with the host aircraft H. As further described, in some embodiments, a method for in-flight recovery of the target aircraft T by the host aircraft H during forward flight may include, for example, deploying the towline 102 downward and away from the host aircraft H, receiving a vertically-oriented portion of the towline 102 into the wing root WR of the target aircraft T, deploying first and second movable portions 120, 122 of the target aircraft T to deployed positions to define the opening 140, maneuvering the target aircraft T to move the capture mechanism 100 toward the towline 102, guiding the towline 102 into the opening 140, guiding the fitting 103 toward undersides of the deployed movable portions 120, 122, stowing the movable portions 120, 122 to capture the fitting 103, retracting the towline 102 toward the host aircraft H to direct the target aircraft T toward the host aircraft H, and/or securing the target aircraft T with the host aircraft H.

As shown in FIG. 2A, the target aircraft T may be maneuvered into an optimal position relative to the host aircraft H, and/or vice versa. The target aircraft T may be below and behind the host aircraft H. The target aircraft T may be laterally in line with the host aircraft H (with respect to directions into and out of the plane of the figure as oriented), or the target aircraft T may be laterally offset from the host aircraft H. The towline 102 may be deployed from the host aircraft H either prior to or after relative positioning of the aircraft H, T.

The towline 102 or portion or thereof, such as a distal end containing the fitting 103, may be oriented vertically or near vertical. "Vertical" as used herein has its usual and customary meaning and includes without limitation a direction aligned with the direction of gravity. In some embodiments, "vertical" may refer to a direction perpendicular to a horizontal component of travel of the host and/or target aircraft H, T. The towline 102 may form an angle B with the vertical direction V, as shown in FIG. 1. In some embodiments, the portion of the towline 102 adjacent to or otherwise near the fitting 103, such as any portions that would interact with the capture mechanism 100, may form the angle B. The angle B may be less than 5 degrees, less than 10 degrees, less than 15 degrees, less than 20 degrees, less than 25 degrees, less than 30 degrees, less than 35 degrees, less than 40 degrees, or less than 45 degrees off the vertical direction V. In some embodiments, the towline 102 in free space (e.g. prior to contact with the target aircraft T) may be angled more than 30 degrees, or more than 45 degrees, and then form the angle B in response to contacting the wing and/or fuselage of the target aircraft. The towline 102 may thus form the angle B immediately prior to the towline 102 entering the space defined between the moveable portions.

As shown in FIG. 2B, the towline 102 extends through the wing root WR of the target aircraft T. As the target aircraft T is maneuvered, the towline 102 may be directed along the fuselage F and/or the wing W of the target aircraft T toward the wing root WR. As used herein, the "wing root WR" may include a region of the target aircraft T where the leading or trailing edge of the wing W intersects the fuselage F. This region is not limited to the surfaces of the wing W and fuselage F, and includes space adjacent to these surfaces extending forward from the wing W and laterally outward away from the fuselage F. The wing root WR may include a triangular region, defined between the nose of the aircraft, the outer tip of the wing, and the intersection of the fuselage and leading edge of the wing. The target aircraft T may be maneuvered relative to the towline 102 so that the towline 102 makes contact directly at the wing root WR of the target aircraft T without contacting the wing W or the fuselage F of the target aircraft T.

As shown in FIG. 2C, the target aircraft T may be maneuvered toward the towline 102 to cause the towline 102 to contact the target aircraft T along the wing W of the target aircraft T and/or the fuselage F of the target aircraft T. The towline T may make some contact with the wing W and/or fuselage F of the target aircraft T before the towline 102 is captured by the capture mechanism 100 of the target aircraft. In some embodiments, the target aircraft T may be maneuvered toward the towline 102 to bring the towline 102 in proximity with the wing W or the fuselage F of the target aircraft T, without necessarily having the towline 102 make contact with the fuselage F or the wing W of the target aircraft T. For instance, the recovery system 90 may use a natural funneling effect to cause the towline 102 to move toward the wing root WR of the target aircraft T, which may be due to contact with the wing W and/or fuselage F, and/or due to aerodynamic forces acting on the towline 102 and/or fitting 103. The leading edge of wing W and side of fuselage F may create and/or enhance an airflow funnel and/or reduced pressure zone that may guide or bias the towline 102 toward the wing root WR and/or toward the fuselage F.

With reference to FIGS. 2C-2E, in some embodiments, the target aircraft T may be maneuvered such that, once the towline 102 reaches the wing root WR and/or with the towline 102 located within the opening 140 as further described, the flight path of the target aircraft T may be altered. For example and without limitation, the target aircraft T may be maneuvered to roll toward the towline 102, yaw toward the towline 102, and/or decrease altitude so that the fitting 103 is brought into proximity with the capture mechanism 100. In some embodiments, at a certain proximity from the towline 102, the target aircraft T may roll, maneuver laterally toward the towline 102, and/or maneuver vertically up or down to bring the towline 102 and/or fitting 103 into proximity with the capture mechanism 100. The first and second movable portions 120, 122 may be in a stowed position during these maneuvers. In some embodiments, the target aircraft T may maneuver laterally toward the towline 102 a distance of five feet or less, ten feet or less, fifteen feet or less, twenty feet or less, twenty-five feet or less, or thirty feet or less. The target aircraft T may lower relative to the towline 102, e.g. decrease the target aircraft T's altitude if the towline 102 is vertically stationary, by one foot or less, two feet or less, three feet or less, four feet or less, five feet or less, six feet or less, seven feet or less, eight feet or less, nine feet or less, ten feet or less, fifteen feet or less, or twenty feet or less. The target aircraft T may roll, i.e. rotate along its longitudinal axis, toward the towline 102 an angular amount, which may be five degrees or less, ten degrees or less, fifteen degrees or less, or twenty degrees or less. This rotation may be relative to a current roll orientation of the target aircraft T, or relative to the horizon.

In any embodiments of the recovery systems disclosed herein, the target aircraft T may approach aft of and to the lateral side of the towline 102, such as from the right of the towline 102 as shown. For capture mechanisms that open to the right side of the target aircraft T, the target aircraft T may approach from the aft and left side of the towline 102. Looking down at the target aircraft T, for instance as shown in FIG. 2D, the target aircraft T may be moved at an angle toward the towline 102, such as at a forty-five degree angle or an approximately a forty-five degree angle relative to the towline 102. In some embodiments, the target aircraft T may be maneuvered toward the towline 102 at a vertical distance of approximately ten to one hundred feet, twenty to eighty feet, thirty to fifty feet, or forty feet below the host aircraft H. FIG. 2B shows the target aircraft T nearing contact with the towline 102. In some embodiments, visual navigation by the remote controller or autonomous flight system of the target aircraft T may be used to assist in the navigation and/or maneuvering of the target aircraft T relative to the towline 102 once the target aircraft T is in close proximity with the towline 102, for example and without limitation, when the target aircraft T is within ten feet or approximately ten feet of the towline 102, or within five feet or approximately five feet of the towline, or within five to twenty feet of the towline 102.

As shown in FIG. 2F, in some embodiments, with the towline 102 either moving along the leading edge of the wing W toward the wing root WR, and/or along the fuselage F toward the wing root WR, and/or in contact with or in proximity of the wing root WR, the second movable portion 122 may be moved to or toward the open or deployed position. The second movable portion 122 may be deployed prior to the towline 102 being deployed and/or being near the target aircraft T. The second movable portion 122 may be located aft of the first movable portion 120. The second movable portion 122 may be positioned on the target aircraft T and configured so that a leading or forward edge 122a of the second movable portion 122 will be aft of the towline 102 during the capture operation, e.g., when the towline 102 is in contact with or proximal to the wing root WR, or as the towline 102 is moving along the leading edge of the wing W of the target aircraft T. In this configuration, the towline 102 may be captured forward of the second movable portion 122 so that the capture mechanism 100 may capture the towline 102 between the first and second movable portions 120, 122.

The towline 102 may be guided into the opening 140, such as a gap or space, defined by and located between the first and second movable portions 120, 122, as the first movable portion 120 is moved to or toward the open position, as shown in FIG. 2E. In some embodiments, the first movable portion 120 may already be deployed prior to movement of the towline toward the opening 140. The opening 140 may have a decreasing width from an outer edge of the movable portions 120, 122 in the inward direction toward the aircraft T between the angled portion 120c of the first movable portion 120 and the outward part of the leading edge 122a of the second movable portion 122. This may create a funnel-shape between the movable portions 120, 122. The opening 140 may then have a constant width section between the trailing edge 120b of the first movable portion 120 and the inward part of the leading edge 122a of the second movable portion. The towline 102 may be received into the decreasing width portion of the opening 140 and then into the constant width portion of the opening 140.

The opening 140 may have an inner-most endpoint 141, which may be a region of the opening 140, that limits further lateral travel of the towline 102. The endpoint 141 may be aligned with a longitudinal axis of the aircraft T, for example located directly over such axis, such that this endpoint 141 is near the middle of the fuselage F as viewed from the top. In some embodiments, this endpoint 141 may be aligned with the center of gravity of the target aircraft T. In some embodiments, the opening 140 may be forward or aft of the center of gravity of the target aircraft T. In some embodiments, the opening 140 may be slightly forward of the center of gravity of the target aircraft T to create a passively stable towed body once the wings are folded or moved to a collapsed state (if the wings are folded or moved to a collapsed state) and/or the engine of the target aircraft is shut down. In some embodiments, the opening 140 may be forward or aft of the center of gravity of the target aircraft T by a particular percentage of the overall longitudinal length of the aircraft, for example by from 2% or less, less than 5%, less than 10%, less than 15% or less than 20% of the length of the aircraft. The opening 140 may have other configurations, such as a uniform width, a changing width, a decreasing width, an increasing width, or combinations thereof.

As shown in FIG. 2G, once the target aircraft T and/or towline 102 have been maneuvered so that the towline 102 is positioned forward of and adjacent to the forward edge 122a of the second movable portion 122, the first movable portion 120 may be deployed to or toward the open position so that the towline 102 is positioned between the aft edge 120b of the first movable portion 120 and the forward edge 122a of the second movable portion 122. With the towline 102 positioned between the aft edge 120b of the first movable portion 120 and the forward edge 122a of the second movable portion 122, the towline 102 and/or target aircraft T may move such that the towline 102 moves vertically upward relative to the target aircraft T, which movement may be toward the host aircraft H, and is drawn upward through the opening 140 of the capture mechanism 100. The fitting 103 or other limiting object fixed to the towline 102 at a particular position on the towline 102 may thus be moved into contact with the capture mechanism 100, for example and without limitation, moved into contact with a lower surface of the first and second movable portions 120, 122.

In some embodiments, the capture mechanism 100 and the fitting 103 may be configured such that the fitting 103 has a width that is larger than a width of an inner section of the opening 140. This inner section may be a portion of the opening 140 that has a constant width, or that otherwise has a width smaller than the width of the fitting 103. The width of the fitting 103 may be larger than a perpendicular distance between the aft edge of the first movable portion 120 and the forward edge of the second movable portion 122. This inner section of the opening 140 may be at or near a base of the first and second movable portions 120, 122. The inner section may be configured such that the fitting 103 cannot vertically pass through the opening 140 between the first and second movable portions 120, 122 as the towline 102 is moved upwardly through the inner section of the opening 140 between the first and second movable portions 120, 122 when the first and second movable portions 120, 122 are in the stowed or deployed positions. In this manner, the capture mechanism 100 may be used to capture or secure the towline 102 to the target aircraft T.

In some embodiments, the target aircraft T may maneuver to locate the towline 102 within the opening 140, into the inner section of the opening 140, and/or into the endpoint 141 of the opening 140. The target aircraft T may roll, yaw, pitch, etc. as previously described.

Figure 2H:
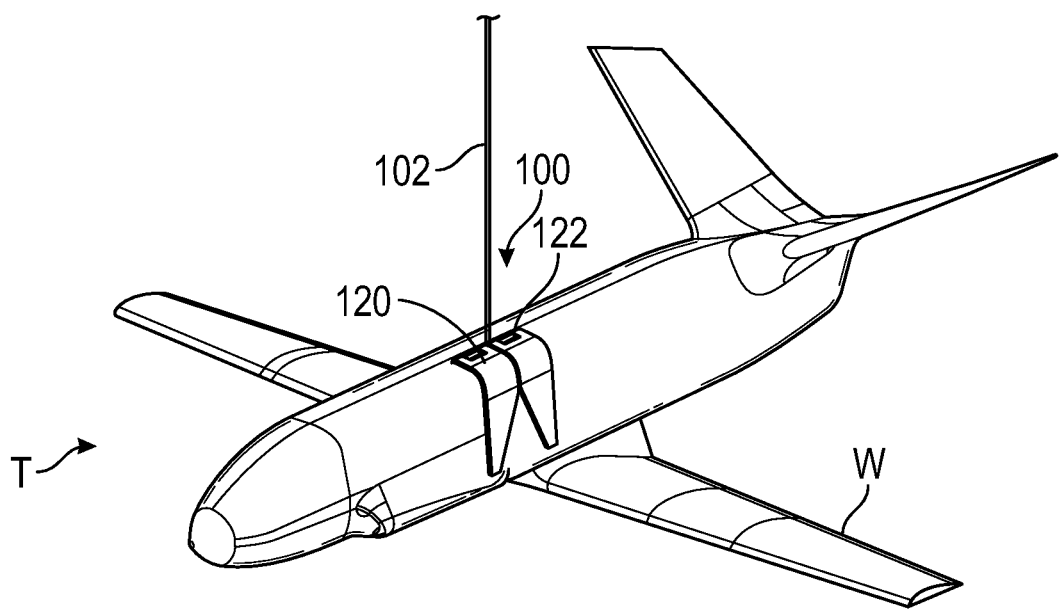

As shown in FIG. 2H, with the fitting 103 located in the inner section and/or at the endpoint 141 of the opening 140, the first and second movable portions 120, 122 may be moved, e.g. simultaneously, toward their respective stowed positions to prevent the towline 102 and/or the fitting 103 from escaping the fuselage F of the target aircraft T or otherwise moving out of engagement with the capture mechanism 100. The towline 102 may extend from the endpoint 141 of the opening 140, or from the inner section of the opening 140.

Figure 2I:
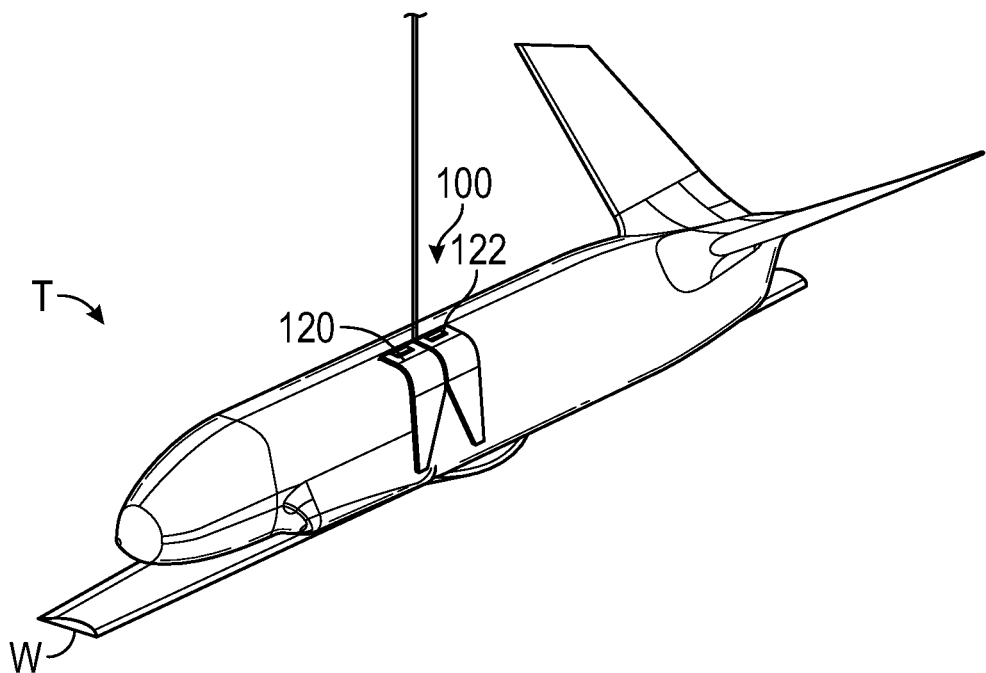
Figure 2J:
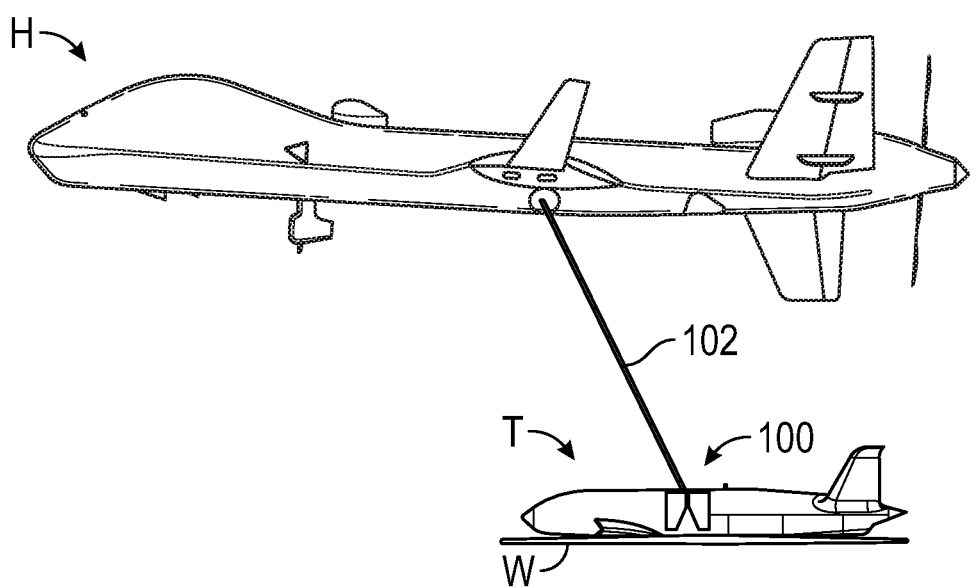

As shown in FIGS. 2I and 2J, some embodiments of the target aircraft T may be configured to take a passive towed body configuration. For example, the wings W may move or rotate to a stowed position. In this example, the wings W move in line with the fuselage F of the target aircraft T. Further details of towed body configurations of the target aircraft are shown in and described with respect to FIGS. 9A-9D.

Figure 2K:
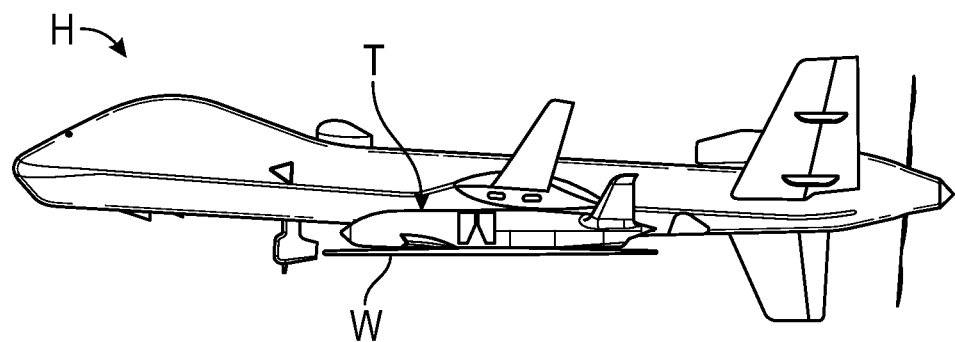

As shown in FIG. 2K, the towline 102 may be reeled in by a hoist system having a winch to pull the target aircraft T toward the host aircraft H. Once the towline 102 is retracted, the target aircraft T may be securely attached to or secured by the host aircraft H. For example, the target aircraft T may attach to a pylon of the host aircraft H. Further details of various embodiments of hoist systems and securement features are shown in and described with respect to FIGS. 8A-14. Optionally, the target aircraft T may also be deployable from the host aircraft H before and/or after recovery. The recovery or deployment may occur during any phase of flight. The recovery may occur during forward flight, ascending or descending flight, takeoff, landing, or other phases.

Figure 3:
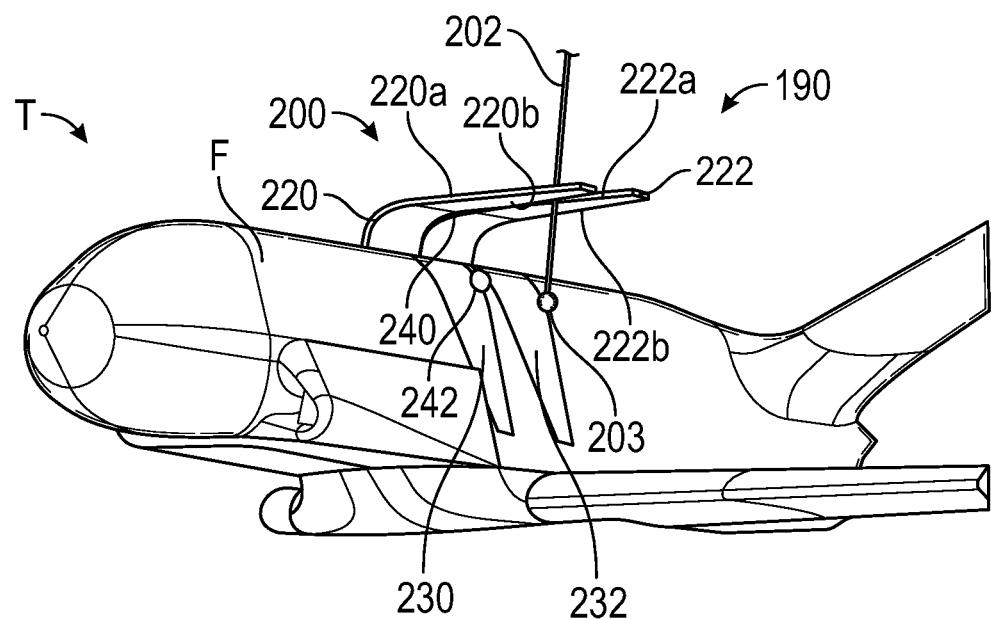
FIG. 3 is a perspective view of another embodiment of a target aircraft having a capture mechanism with a towline extending downward from a host aircraft.

FIG. 3 depicts another embodiment of a system 190 for recovery of a target aircraft T having a capture mechanism 200. The recovery system 190 may have the same features and/or functions as the recovery system 90, and vice versa. For example, the capture mechanism 200 may be coupled with a fuselage F of a target aircraft T and may be configured to capture a towline 202 tethered to a host vehicle (not shown). The capture mechanism 200 may include a first movable portion 220 and second movable portion 222. The first movable portion 220 may have a leading edge 220a and a trailing edge 220b, and the second movable portion 222 may have a leading edge 222a and a trailing edge 222b. The first and second movable portions 220, 222 may be configured to rotate or move between a first, closed or stowed position and a second, open or extended position. For example and without limitation, FIG. 3 shows the first and second movable portions 220, 222 in a second, open position. The capture mechanism 200 may have a first recess 230 configured to receive the first movable portion 220 therein when the first movable portion 220 is in the closed position, and a second recess 232 configured to receive the second movable portion 222 therein when the second movable portion 222 is in the closed position, to optimize the aerodynamics of the capture mechanism.

Further, the capture mechanism 190 may include a catch 242 configured to receive the fitting 203. The catch 242 may be located within the recess 230 and/or recess 232. The catch may be a device the secures, for example grabs, the fitting 203. In some embodiments, the catch 242 may be a round opening in the cavity or recesses configured to receive the fitting 203 therein as the movable portions 220, 222 close and move the fitting 203 through and/or into the catch 242.

Figure 4A:
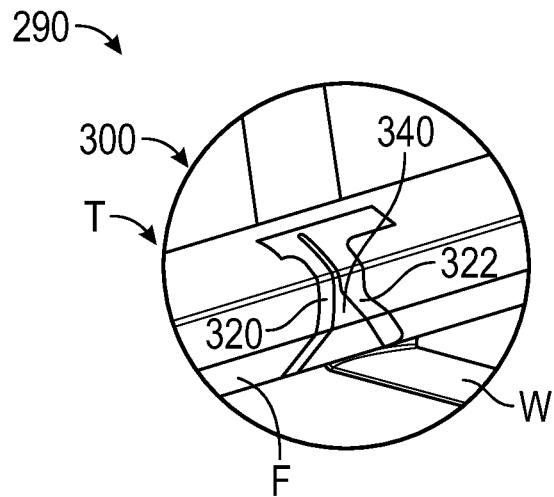
FIGS. 4A-4D are partial sequential perspective views of another embodiment of a capture mechanism on a target aircraft capturing a towline extending downward from a host aircraft.
Figure 4B:
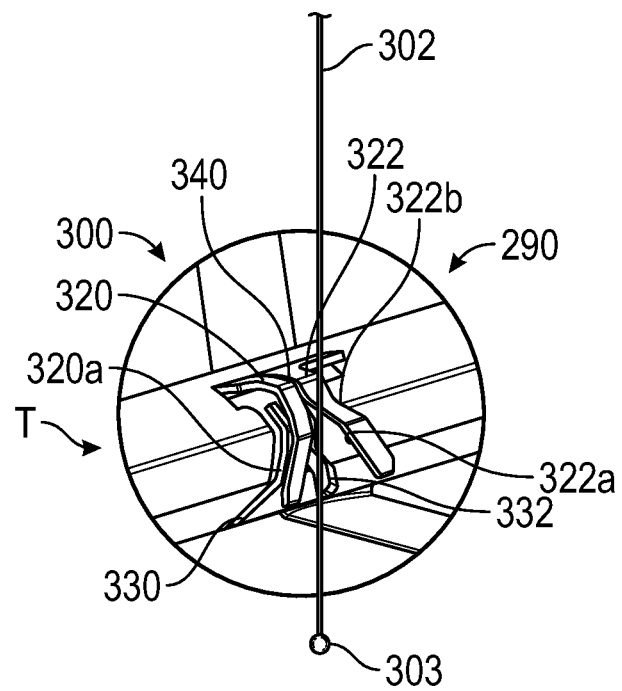
Figure 4C:
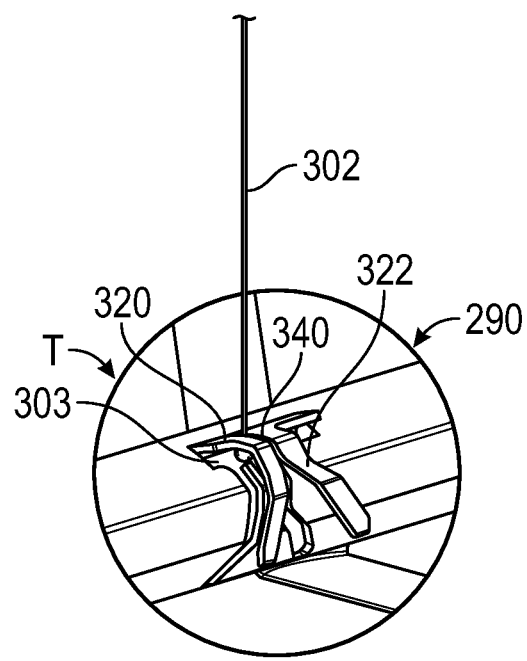
Figure 4D:
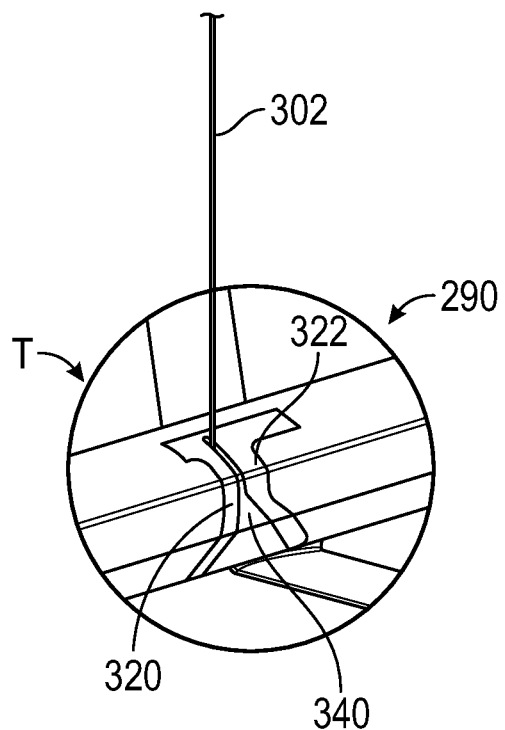
Figure 5A:
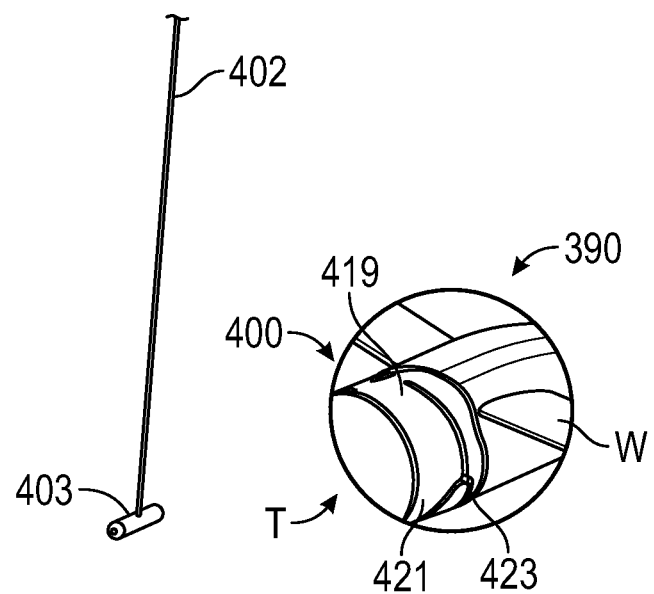
FIGS. 5A-5F are partial sequential perspective views of another embodiment of a capture mechanism on a target aircraft capturing a towline extending downward from a host aircraft.
Figure 5B:
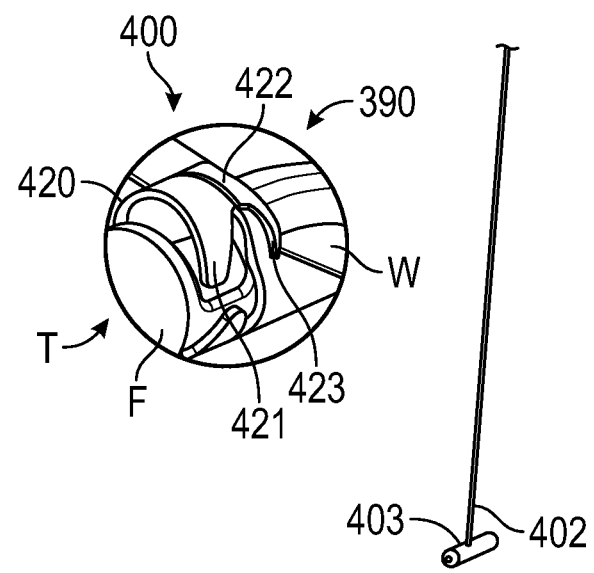
Figure 5C:
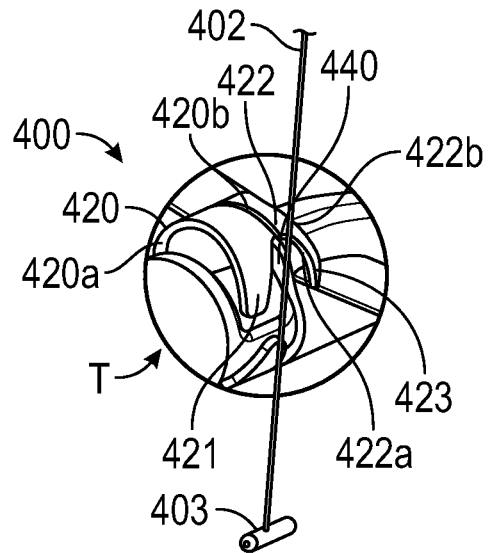
Figure 5D:
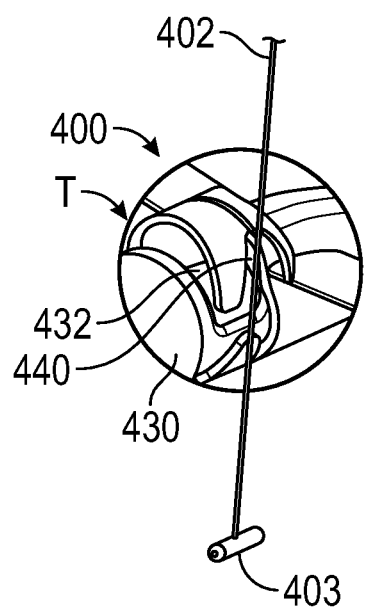
Figure 5E:
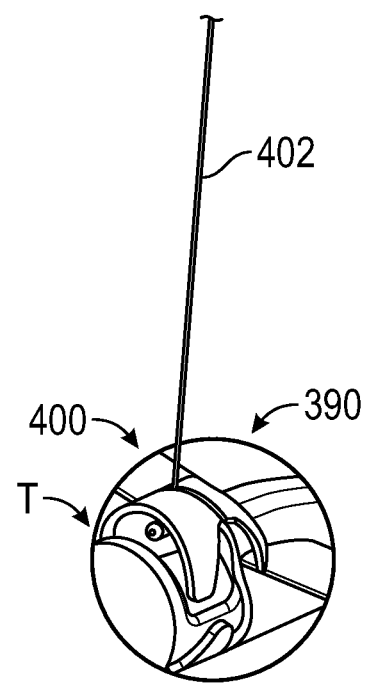
Figure 5F:
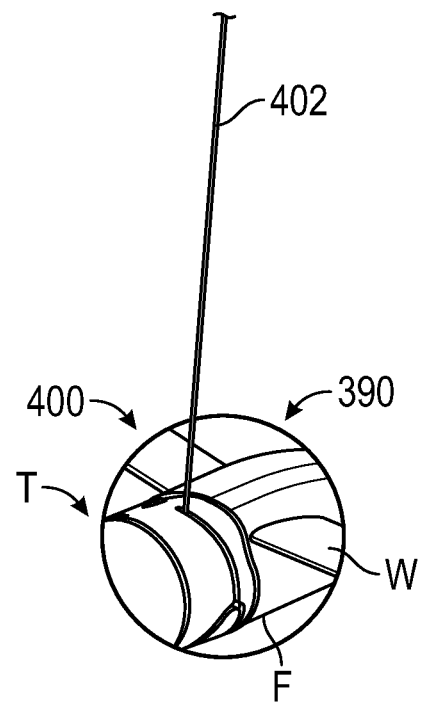
Figure 6A:
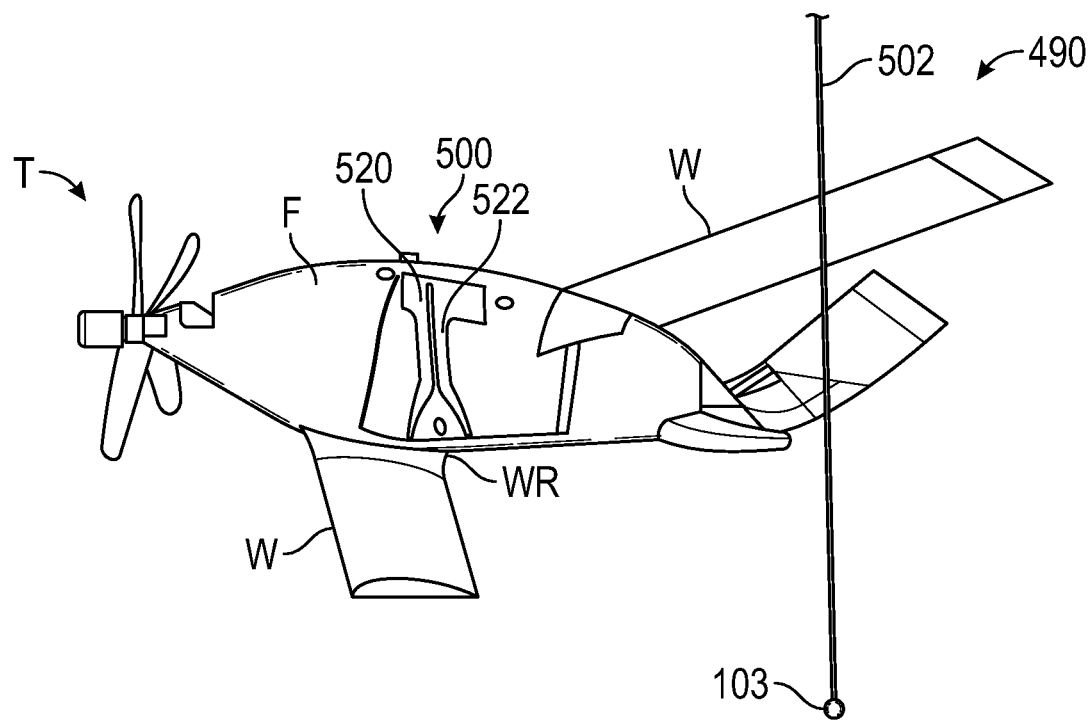
FIGS. 6A-6F are sequential side views of another embodiment of a target aircraft having a capture mechanism with a towline extending downward from a host aircraft and located rearward of the target aircraft wing.
Figure 6B:
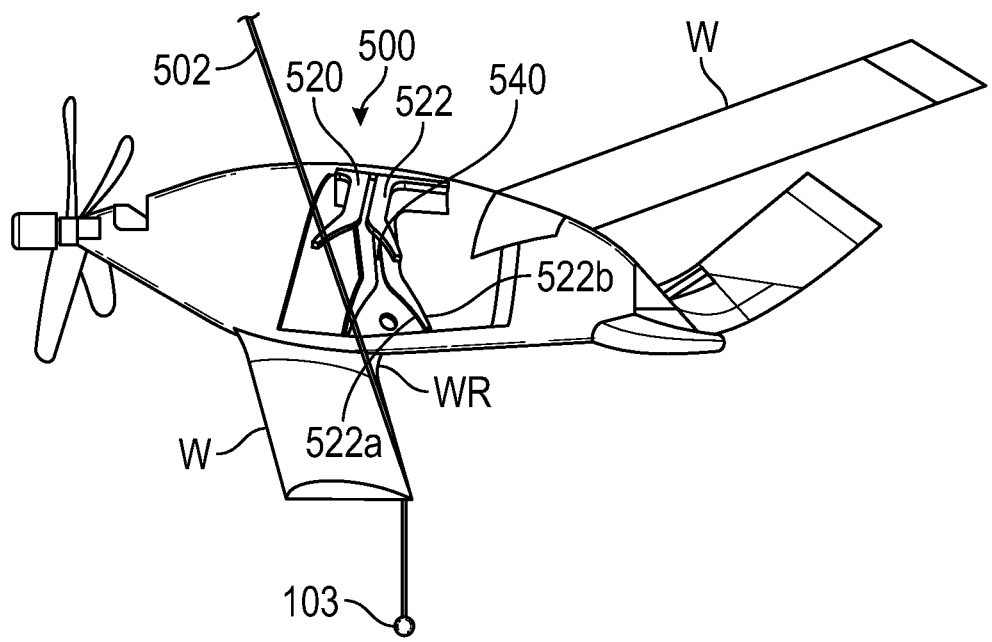
Figure 6C:
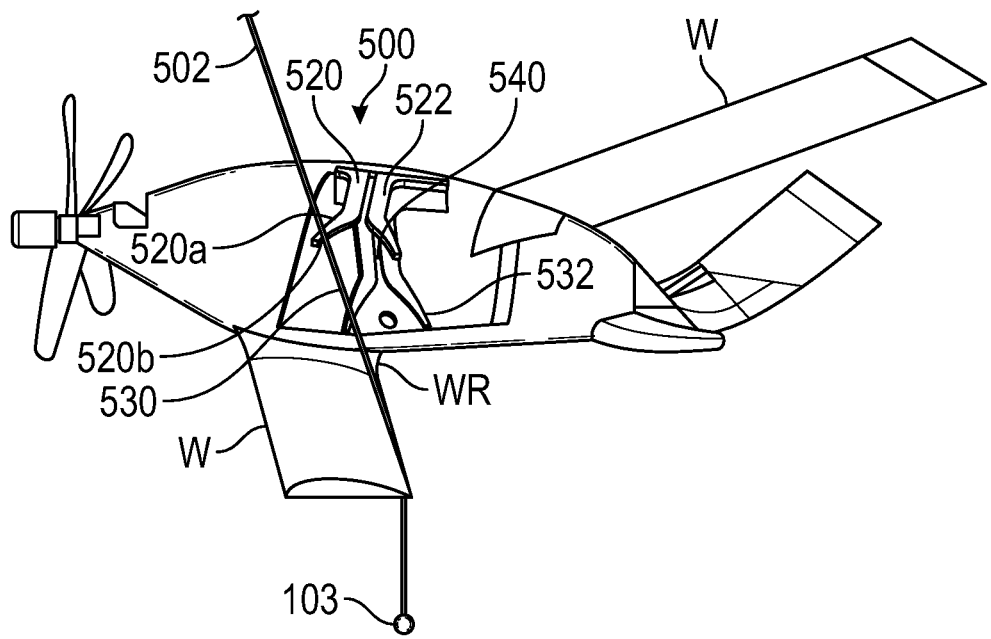
Figure 6D:
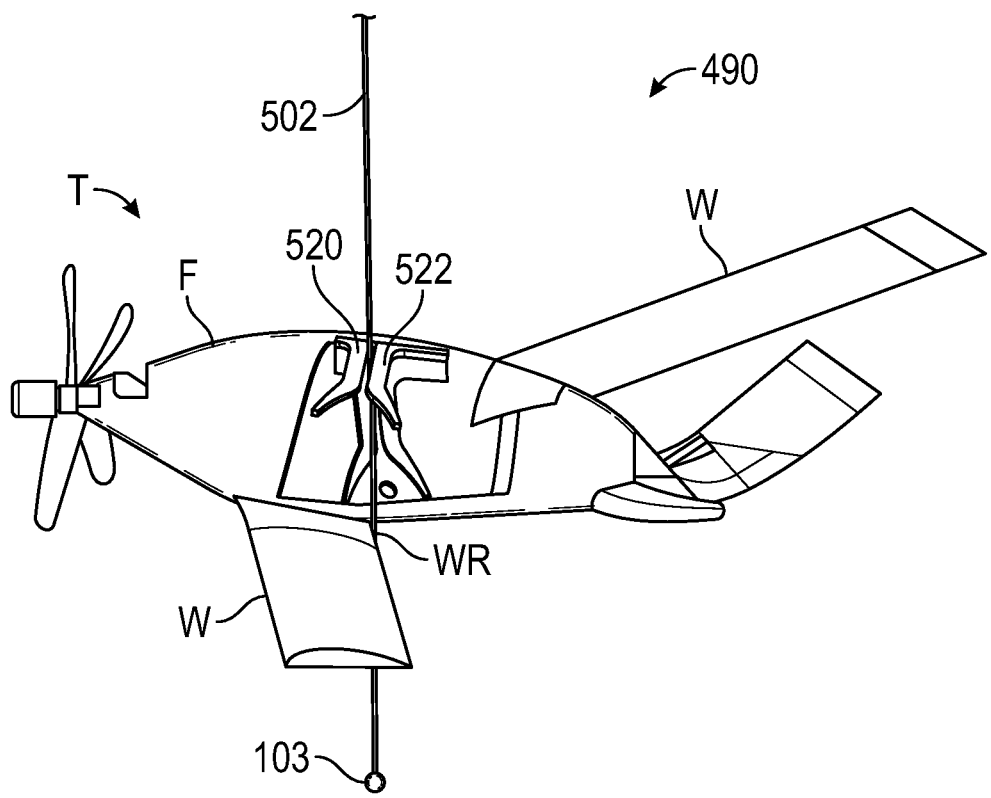
Figure 6E:
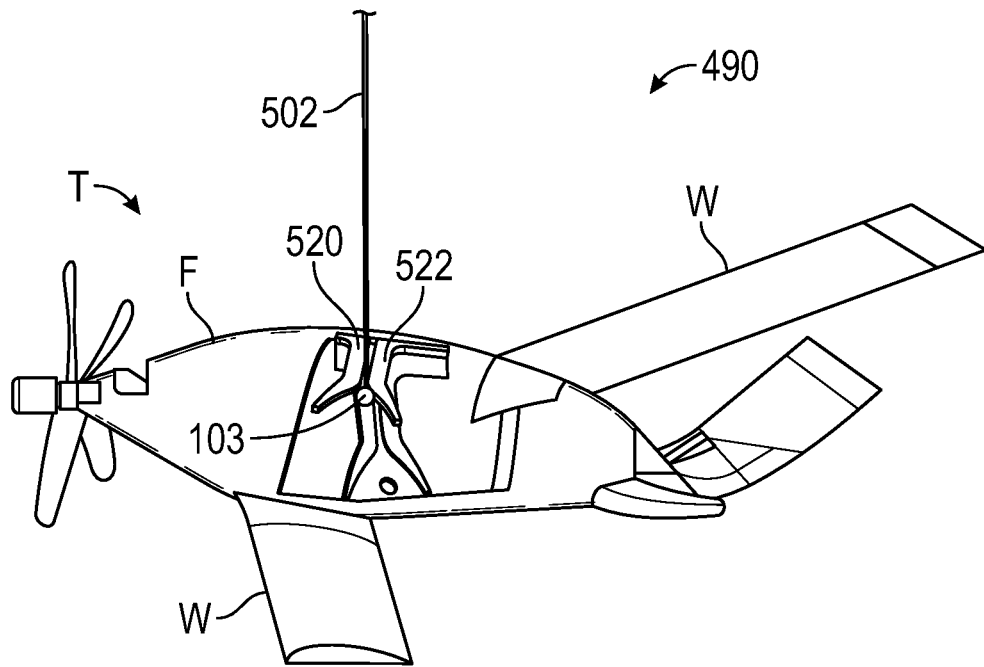
Figure 6F:
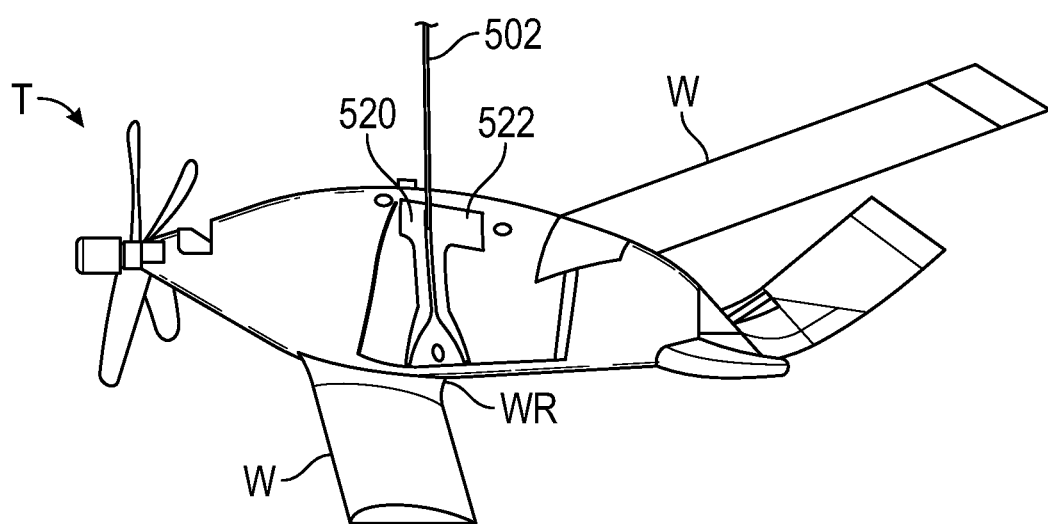

FIGS. 4A-4D depict sequential views of another embodiment of a recovery system 290 for recovery of a target aircraft T having a capture mechanism 300. The recovery system 290 may have any of the same features and/or functions as the recovery system 90 or 190, and vice versa. For example, the capture mechanism 300 may be coupled with a fuselage F of a target aircraft T and may be configured to capture a towline 302 tethered to a host vehicle (not shown). The capture mechanism 300 may include a first movable portion 320 and second movable portion 322. The first movable portion 320 may have a leading edge 320a and a trailing edge 320b, and the second movable portion 322 may have a leading edge 322a and a trailing edge 322b. The first and second movable portions 320, 322 may be configured to rotate or move between a first, closed or stowed position and a second, open or extended position. For example and without limitation, FIG. 4B shows the first and second movable portions 320, 322 in a second, open position. The capture mechanism 300 may have a first recess 330 configured to receive the first movable portion 320 therein when the first movable portion 320 is in the closed position, and a second recess 332 configured to receive the second movable portion 322 therein when the second movable portion 322 is in the closed position.

Further, the first and/or a second movable portions 320, 322 may have a segmented "ski" shape. The movable portions 320, 322 may be elongated members with multiple segments to match the contour of the fuselage F and provide a wider outer opening 340 for the towline 302. The inner segments of each movable portion 320, 322 may be spaced to define a constant width opening therebetween. A second outward segment adjacent the inner segment of each movable portion 320, 322 may angle away from each other and have an increasing width therebetween in a direction away from the base of the movable portions 320, 322. A third outer segment adjacent the second segment of each movable portion 320, 322 may angle outward even more than the second segments, and have an increasing width therebetween that increases at a faster rate in an outer direction as compared to the distance between the second segments. This configuration may create a larger outermost width of an opening 340 located between outer endpoints of the movable portions 320, 322 to increase reliability of receiving the towline 302 between the movable portions 320, 322 and into the inner section of the opening 340.

FIGS. 5A-5F depict sequential views of another embodiment of a recovery system 390 for recovery of a target aircraft T having a capture mechanism 400. The recovery system 390 may have any of the features and/or functions as the recovery systems 90, 190, or 290, and vice versa. For example, the capture mechanism 400 may be coupled with a fuselage F of the target aircraft T and may be configured to capture a towline 402 tethered to a host vehicle (not shown). The capture mechanism 400 may include a first movable portion 420 and second movable portion 422. The first movable portion 420 may have a leading edge 420a and a trailing edge 420b, and the second movable portion 422 may have a leading edge 422a and a trailing edge 422b. The first and second movable portions 420, 422 may be configured to rotate or move between a stowed position and a deployed position. The capture mechanism 400 may have a first recess 430 configured to receive the first movable portion 420 therein when the first movable portion 420 is in the closed position, and a second recess 432 configured to receive the second movable portion 422 therein when the second movable portion 422 is in the closed position.

Further, the first and second movable portions 420, 422 may be integral and move together. The movable portions 420, 422 may have a single shared base 419 that rotates outward, and include two prongs 421, 423 respectively extending outwardly from the base 419. The base 419 may rotate about an axis that is located on an opposite side, for example right side, of the fuselage F as the side from which the towline 402 is incoming, for example the left side. The base 419 and/or movable portions 420, 422 may have a rounded, e.g. circular or elliptical, contour to match the fuselage cross-sectional shape. An opening 440 may be defined between the two prongs 421, 423 having a width that decreases in an inward direction toward the aircraft T to a smaller width inner section, which may have a constant width. A fitting 403 may have an elongated shape, such as cylindrical and, in some embodiments, have rounded edges near the longitudinal ends of the fitting 403, as shown. In any embodiments disclosed herein, the fitting 403 can be cylindrical in shape, as shown in FIGS. 5A-5E, but may be shorter or longer in length than shown. For example and without limitation, the fitting 403 of any embodiments can have more of an elongated pill shape. The fitting 403 may be long enough to not fit through the inner section of the opening 440. The fitting 403 may be rounded to match a rounded contour of the underside of the movable portions 420, 422, for example to self-center itself underneath the movable portions 420, 422 in the stowed position.

FIGS. 6A-6F depict sequential views of another embodiment of a system 490 for recovery of a target aircraft T having a capture mechanism 500. The recovery system 490 may have any of the features and/or functions as the recovery systems 90, 190, 290 or 390, and vice versa. For example, the capture mechanism 500 may be coupled with a fuselage F of the target aircraft T and may be configured to capture a towline 502 tethered to a host vehicle (not shown). The capture mechanism 500 may include a first movable portion 520 and second movable portion 522. The first movable portion 520 may have a leading edge 520a and a trailing edge 520b, and the second movable portion 522 may have a leading edge 522a and a trailing edge 522b. The first and second movable portions 520, 522 may be configured to rotate or move between a stowed position and a deployed position.

Further, the wing root WR may be a region located aft of the wing, as shown. This region may include space aft of the wing and laterally to the left side of the fuselage. The region may be bounded by the intersection of the trailing edge of the wing and the fuselage, the tail, and the outer tip of the left wing. Thus, the towline 502 may be located aft of the wing and/or to the left of the fuselage. The target aircraft T may slow its speed while maneuvering to have the towline 502 located within this aft wing root WR. Additionally, the first and second movable portions 520, 522 may be separate and configured to move independently of one another or to move simultaneously and equally depending on the desire of the operator or of the autonomous system. For example, the towline 502 may be at an angle or position where only one, or both, movable portions 520, 522 should be deployed, and the mechanism can be operated accordingly. The movable portions 520, 522 may also have a length that, when deployed, extends an outermost tip of the movable portions 520, 522 farther outward to allow for capture of the towline 502 located farther from the fuselage F. For example, the movable portions 520, 522 may deploy to locate the outermost tips beyond an outer, lateral side of the fuselage F, and/or beyond the intersection of the wing W and fuselage F, and/or beyond 5%, beyond 10%, beyond 15%, or beyond 20% or more of the wingspan as measured between opposite tips of the wings W.

The following details apply to any recovery system and any capture mechanism embodiments disclosed herein. In some embodiments, servos, electric motors (high torque geared motors), linear or rotational actuators (for example and without limitation, screw driven linear actuators), hydraulic, pneumatic, and/or other actuation mechanisms may be used to move the first and second movable portions between the first and second positions. For example and without limitation, a first servo, motor, and/or actuator may be configured to rotate a shaft or axle that the first movable portion is coupled with to rotate the first movable portion between the first and second positions. A second servo, motor, and/or actuator may be configured to rotate a shaft or axle that the second movable portion is coupled with to rotate the second movable portion between the first and second positions. The first and second servo, motor, and/or actuators may be independently controlled. In some embodiments, a single servo, motor, actuator, and/or combination thereof may be used to move both the first and second movable portions.

In some embodiments, the first and second movable portions may be integrally formed—e.g., may be formed as a single structure, and/or may be separately formed and rigidly connected. In this arrangement, the capture mechanism may be configured such that the first and second movable portions move as a single unit, such that they both moved between the first, close position and a second, open position simultaneously.

In some embodiments, the first and second movable portions may be configured to rotate around one or two shafts or axes. For example and without limitation, embodiments wherein the first and second movable portions are connected, made from a single piece, or otherwise configured to move together and simultaneously, the first and second movable portions may rotate about a single shaft or axis.

In some embodiments, the shaft or axis of rotation that the first and second movable portions may be configured to move or rotate about may be located on the same side of the fuselage as the target wing root toward which the towline will be directed. In some embodiments, the shaft or axis of rotation that the first and second movable portions may be configured to move or rotate about may be located on the opposite side of the fuselage as the target wing root toward which the towline will be directed, as in the embodiment of the capture mechanism 400 shown in FIGS. 5A-5F, or on an upper portion of the fuselage, as in the embodiment of the capture mechanism 100 shown in FIGS. 1-2K.

In any embodiments disclosed herein, the capture mechanism and/or fuselage of the target aircraft T may be configured to have a recess or chamber sized and positioned to receive the fitting therein so that the fitting does not prevent or inhibit the moving of the capture mechanism to the second, closed state. For example and without limitation, any embodiments of the capture mechanism or the fuselage of the target aircraft T may have a recess, chamber, or space formed therein that is sized and configured to receive the fitting therein as the towline is being advanced into the space or recess between the first and second movable portions of the capture mechanism. In some embodiments, the recess or space configured to receive the fitting may be generally aligned with the space or recess between the first and second movable portions of the capture mechanism since, in some embodiments, the capture mechanism may be configured to bias the towline and the fitting toward the space between the first and second movable portions of the capture mechanism. In some embodiments, the recess or space configured to receive the fitting may have sloping side portions and/or be configured to bias the fitting toward a middle of the recess or space, or otherwise facilitate the movement of the fitting into the recess or space.

Additionally, in some embodiments, though not required, the capture mechanism may have latch mechanisms or other securing mechanisms to selectively latch or secure the first and second movable portions in the closed position to prevent the first and second movable portions from moving toward the open position as the target aircraft T is being lifted toward the host aircraft H (e.g., as an upward force is exerted on the first and second movable portions from the towline and fitting). The latch mechanisms in some embodiments may be electronically controlled so that the latch mechanisms may be released or opened before the first and second movable portions are desired to be moved to the open position. In some embodiments, the latch mechanism may include sliding pins and complementary receiving features.

In any embodiments disclosed herein, though not required, the capture mechanism can be configured to couple with the fitting or couple with the towline so that the towline extends from the target aircraft T at an approximately lateral center of the target aircraft so that the force exerted on the target aircraft by the towline as the towline is being withdrawn is approximately at a lateral center of the target aircraft. In some embodiments, the capture mechanism may be configured to bias the fitting or fitting, or the towline so that the towline extends from the target aircraft T at an approximately lateral center of the target aircraft so that the force exerted on the target aircraft by the towline as the towline is being withdrawn is approximately at a lateral center of the target aircraft. In other embodiments, the capture mechanism may be configured to bias the fitting or fitting or the towline so that the towline extends from the target aircraft T offset from the lateral center of the target aircraft. In these embodiments, the target aircraft may be configured to counteract any off-center force applied to the target aircraft T by the towline as the towline is being withdrawn toward the host aircraft.

In any embodiments of the systems for recovering a target aircraft disclosed herein, including without limitation the embodiments of the systems 90, 190, 290, 390, and 490, the towline may be a simple, uniform towline and may include a fitting (such as, without limitation, fitting 103, 203, 303, 403, 503) positioned along a length thereof. The towline of any embodiment herein may have a width between 0.1 to 1.0 inch (in), or between 0.125 to 0.75 in, or between 0.125 to 0.625 in, or between 0.25 to 0.5 in. The towline maybe steel, stainless steel, improved plow steel, aluminum, synthetic such as nylon, aramid, dyneema or any other material suitable for extended outdoor use in moderately harsh environments. The towline may have a core that is strand, fiber, or independent wire rope core (IWRC). The towline finish may have a corrosion resistant coating (e.g. zinc, nickel, galvanized), or be unfinished. The towline may be uncoated, or coated for abrasion, chemical and/or weather resistance. The towline may have a breaking strength of between 1,000 and 10,000 pound-force (lbf), or between 1,500 and 7,500 lbf, or between 2,000 and 5,000 lbf.

As described above, the fitting of any embodiments of the system for recovering a target aircraft disclosed herein may be configured to provide a stop on the towline, when the fitting engaged with the capture mechanism, to prevent further movement of the towline in at least an upward direction relative to the capture mechanism. Further, at least when the capture mechanism is in a closed position, the fitting may be captured by the capture mechanism and be prevented from moving out of contact with or away from the capture mechanism. In some embodiments, all or a portion of the fitting may be sufficiently rigid so as to remain substantially undeformed or uncollapsed during any recovery operation. For example and without limitation, all or a portion of the fitting may be rigid enough to remain substantially undeformed and uncollapsed when the fitting has been captured by the capture mechanism, when the capture mechanism moves to the second, closed state, and/or when the target aircraft is being withdrawn toward the host aircraft during a recovery operation by withdrawing the towline that the fitting is coupled with.

In any embodiments, the fitting may have any desirable weight and size, and may have any desired shape. For example with without limitation, in any embodiments, the fitting may have a spherical shape, a conical shape, an oblong shape, or any other desired shape, as further described.

FIGS. 7A-7H illustrate different embodiments of fittings that may be used with or as part of any embodiments of the recovery systems disclosed herein. Any of the fittings shown in FIGS. 7A-7H may be used with any of the various recovery systems described herein. Further, any features of one of the fittings may be applied to any of the other fittings.

Figure 7A:
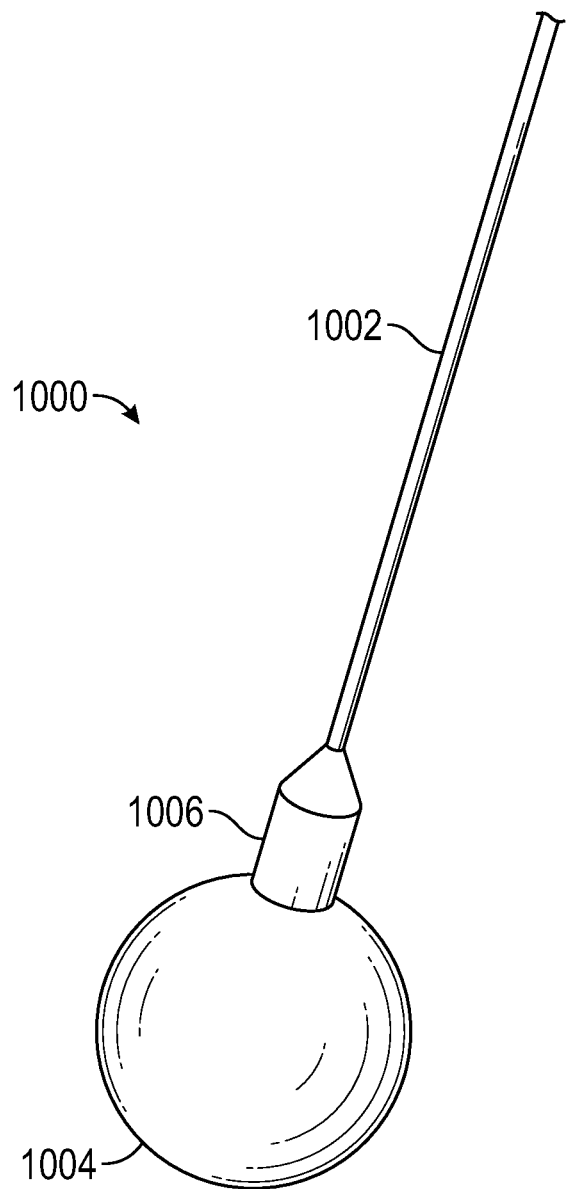
FIGS. 7A-7H are various views of various embodiments of end fittings that may be attached to a towline for any of the recovery systems described herein.

FIG. 7A shows an embodiment of a fitting 1000 coupled with or attached to a towline 1002. The fitting 1000 may have a distal portion 1004 (also referred to herein as a body portion) that may be spherical and a proximal portion 1006 (also referred to herein as a leading portion) that may be generally cylindrical. The distal portion 1004 may be solid, hollow, thin walled, or combinations thereof. The proximal portion 1006 may be coupled with the distal portion 1004 or may be integrally formed. A proximal end of the proximal portion 1006 may be pointed or tapered. The proximal portion 1006 may extend through the opening formed by the flaps of the capture mechanism. The distal portion 1004 may be too large to fit through the opening, such that the flaps contact and engage the distal portion to move the fitting 1000 into the recess of the fuselage when the flaps move from the deployed position to the closed position.

A diameter or size of the proximal portion 1006 may be less than a maximum diameter or size of the distal portion 1004, such as, without limitation, at a distal end of the distal portion 1004. In some embodiments, the diameter or size of the proximal portion 1006 may be 10%, less than 10%, or approximately 10% of a size or diameter of the distal portion, or from 10% to 40% or approximately 40% of a maximum size or diameter of the distal portion 1004. In some embodiments, the spherical portion of the fitting 1000 may have a width, e.g. diameter, from 1 to 10 inches (in), from 2 to 8 in, from 3 to 7 in, from 4 to 6 in, or about 5 in. The fitting 1000 may weigh from 1 to 20 pounds (lbs), from 1 to 15 lbs, from 2 to 10 lbs, or from 4 to 8 lbs. These width and weight features may apply to any of the embodiments of the fittings described herein.

In some embodiments, a maximum diameter or size of the distal portion 1004 of the fitting 1000 may be many times greater than a diameter of the towline 1002, for example and without limitation, at least fifty times greater than a diameter of the towline, or from twenty times greater to eighty times greater than a diameter of the towline, or from thirty times greater to sixty times greater than a diameter of the towline.

Figure 7B:
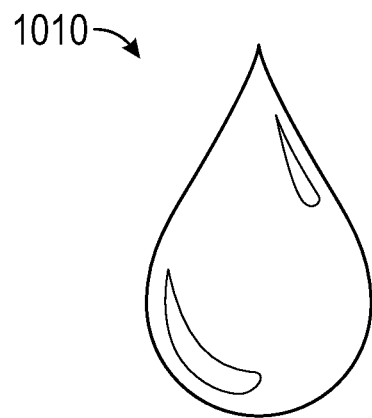

FIG. 7B is a side view of another embodiment of a fitting 1010 having a tear-drop shape. The fitting 1010 may increase in width from a top to a bottom portion and then decrease in width. The contour may be smooth, with a conical upper portion and spherical lower portion. The conical upper portion may extend through the opening of the flaps and the width of the bottom portion may prevent the fitting from traversing the opening completely.

Figure 7C:
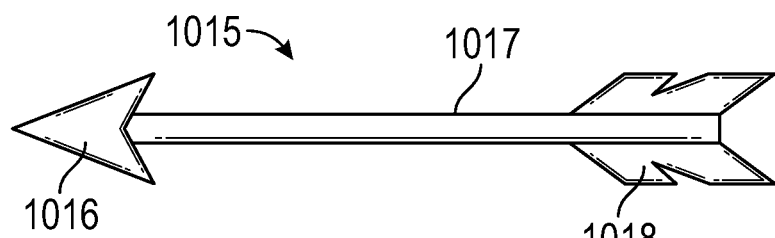

FIG. 7C is a side of another embodiment of a fitting 1015 having an arrow shape. The fitting 1015 may have a forward angular portion 1016 attached via an elongated member 1017 to an aft feathered portion 1018. The angular portion 1016 may form a vertex pointing forward and increase in width in the aft direction. The angular portion 1016 may be planar or three-dimensional, e.g. a conical shape. The feathered portion 1018 may have various protrusion extending outward and aft, and may be planar or three-dimensional. In use, the towline may attach along the member 1017, with the towline extending through the opening of the flaps, and the fitting 1015 engaging with the underside of the flaps.

Figure 7D:
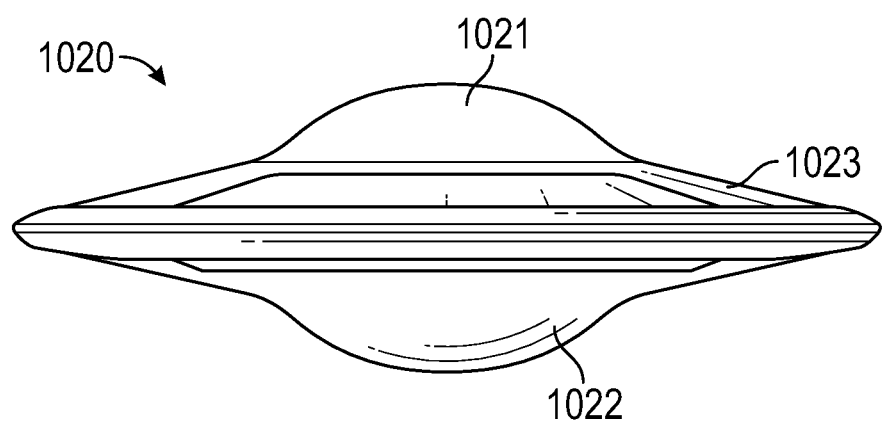

FIG. 7D is a side view of another embodiment of a fitting 1020 having a flying saucer shape. The fitting 1020 may have upper and lower portions 1021, 1022 that have spherical contours bulging upward and downward from a ring-like middle portion 1023. The middle portion 1023 may extend radially farther than the upper and lower portions 1021, 1022. The upper and lower portions 1021, 1022 may be symmetric about the middle portion 1023.

Figure 7E:
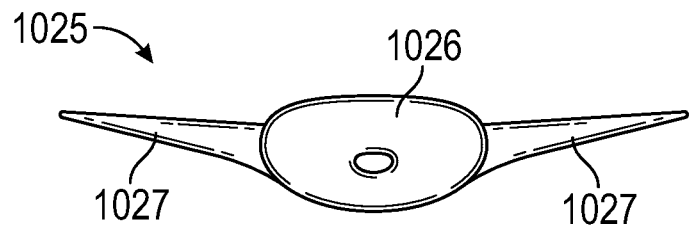
Figure 7F:
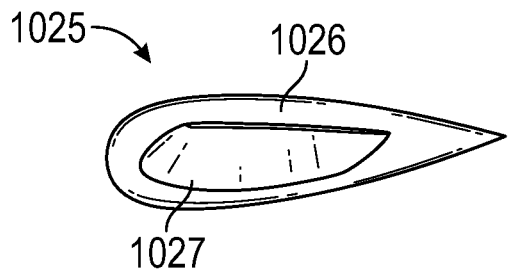

FIGS. 7E and 7F are front and side views respectively of a fitting 1025 having a blended-wing body shape with dihedral wings 1027 attached on both sides of a center portion 1026. The wings 1027 may extend upward from the center portion 1026. The center portion 1026 may have an airfoil profile, for example a rounded, blunt forward end that tapers to a point or reduced height at an aft end, as shown in FIG. 7F. In use, the towline may extend through the opening of the flaps, with the wings 1027 preventing the fitting 1025 from completely traversing the opening.

Figure 7G:
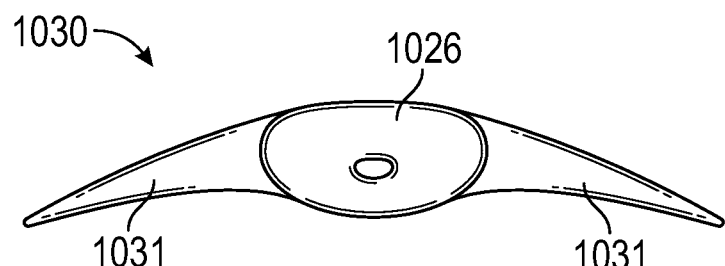
Figure 7H:
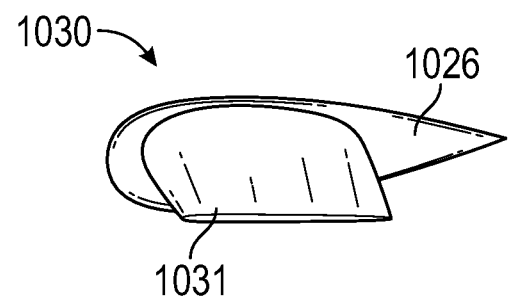

FIGS. 7G and 7H are front and side views respectively of a fitting 1030 having a blended-wing body shape with anhedral wings 1027 attached on both sides of the center portion 1026. The wings 1027 may extend downward from the center portion 1026. In use, the towline may extend through the opening of the flaps, with the wings 1031 preventing the fitting 1030 from completely traversing the opening.

Figure 8A:
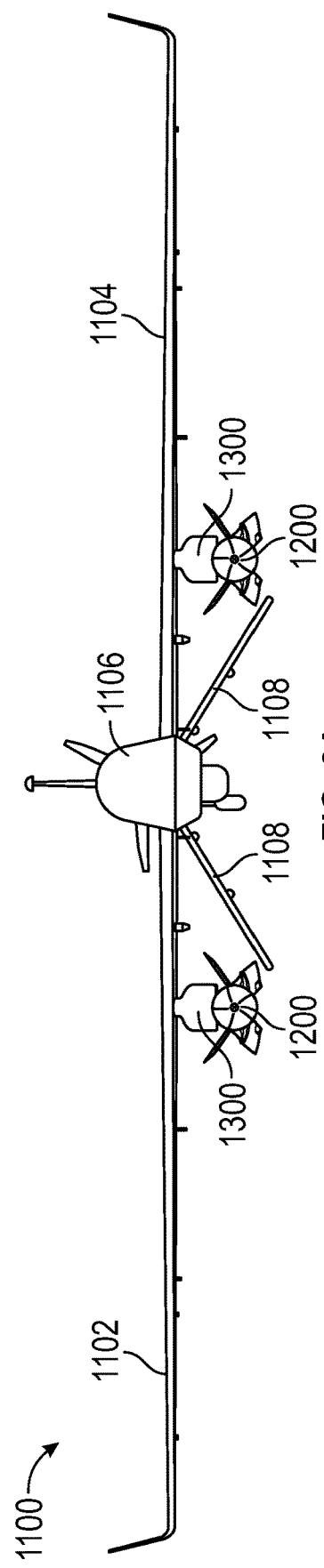
FIGS. 8A-8C are front, perspective and top views respectively of a host aircraft in flight having multiple target aircrafts secured to the host aircraft wings via hoist systems.
Figure 8C:
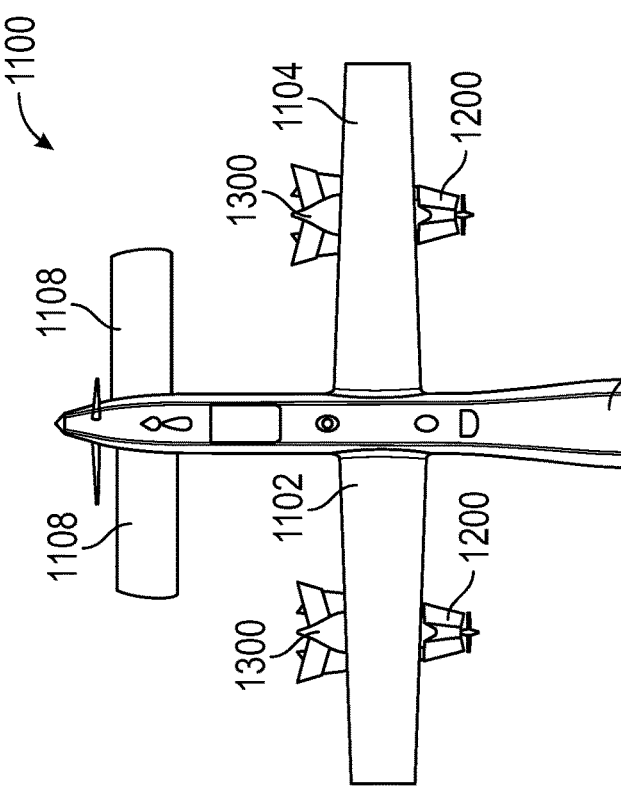
Figure 8B:
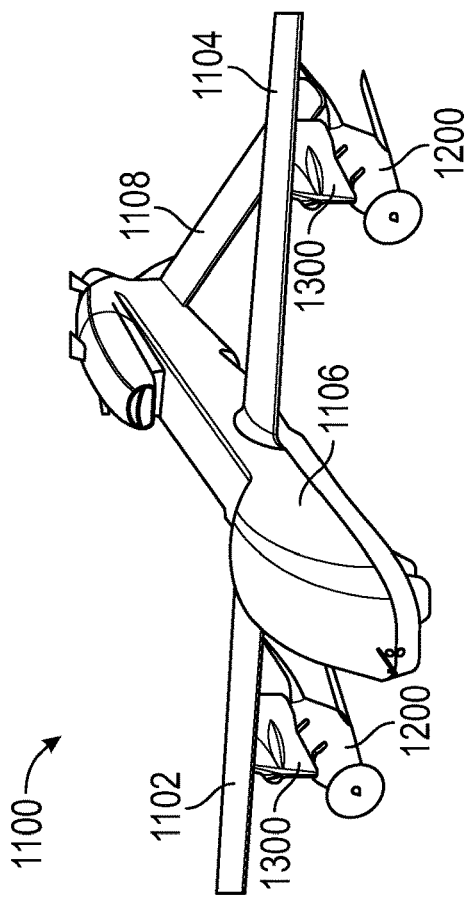

FIGS. 8A-8C are front, perspective, and top views respectively of a host aircraft 1100 in flight having multiple target aircrafts 1200 secured via hoist systems 1300. The aircraft 1100 includes a right wing 1102, a left wing 1104, a central fuselage 1106, and an inverted-V tail 1108. The host aircraft 1100 may be unmanned, and it may be autonomously flown or remote controlled by a human operator. Other types and configurations of the aircraft 1100 may be used, and this is merely one example embodiment.

The hoist systems 1300 are attached to an underside of a respective wing 1102, 1104. The hoist system 1300 may have some or all of the same or similar features and/or functions as the hoist 110 described with respect to FIG. 1, and vice versa. There may be fewer than or greater than one hoist system 1300 per wing. There may be zero, one, two, three, four, five, six or more hoist systems 1300 per wing. The hoist system 1300 in flight may deploy one or more towlines to capture a respective target aircraft 1200, reel in the respective target aircraft 1200 toward the host aircraft 1100 by reeling in the respective towline, and secure the respective target aircraft 1200 to a respective hoist system 1300, as further described herein.

Figure 9B:
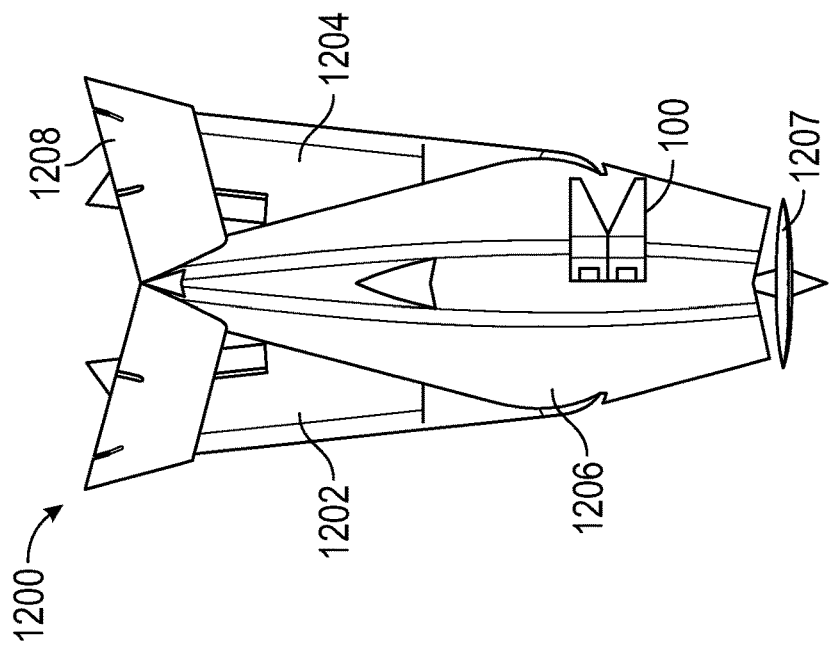
Figure 9A:
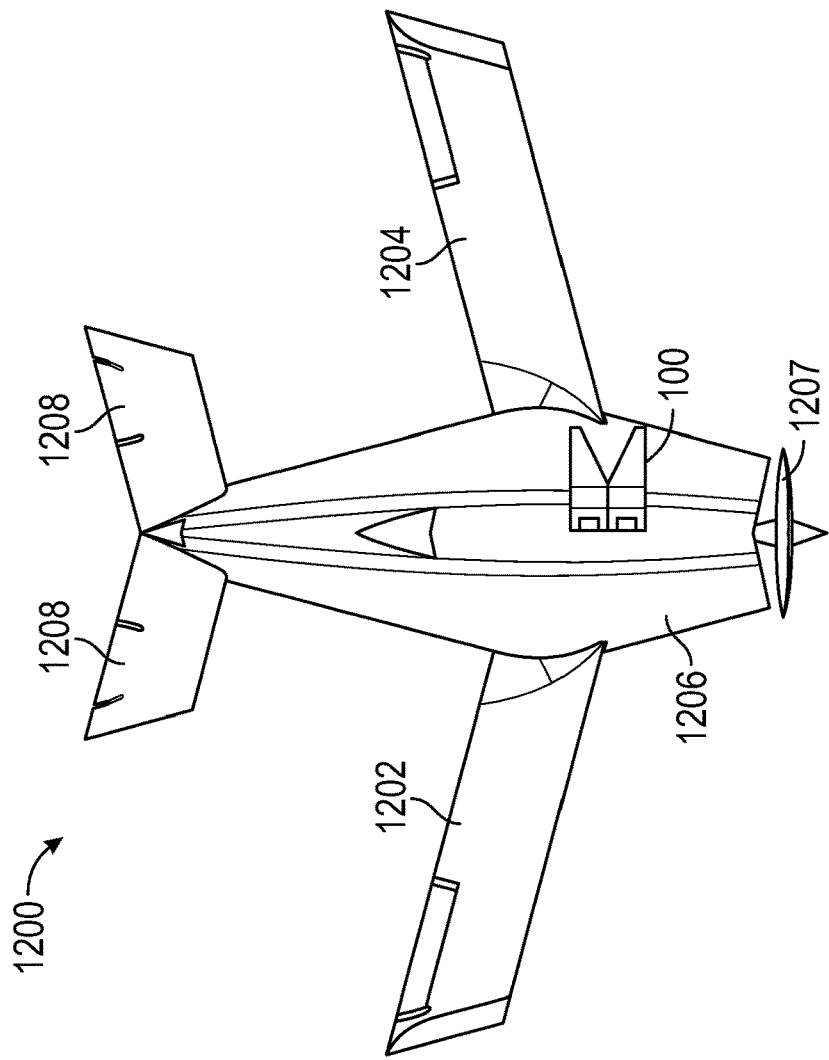

FIGS. 9A and 9B are top views of the target aircraft 1200 shown with the wings 1202, 1204 deployed and stowed, respectively. FIGS. 9C and 9D are front views of the target aircraft 1200 showing the wings 1202, 1204 deployed and stowed, respectively. The 1202, 1204 are rotatably attached to a center fuselage 1206 and may move from a deployed configuration having a larger width for horizontal flight to a stowed configuration having a smaller width for recovery by the host aircraft and hoist system. The target aircraft 1200 has a propeller 1207 shown schematically. The target aircraft 1200 may be propeller driven, or it may have a turbofan, turbojet, or other type engine.

Figure 10:
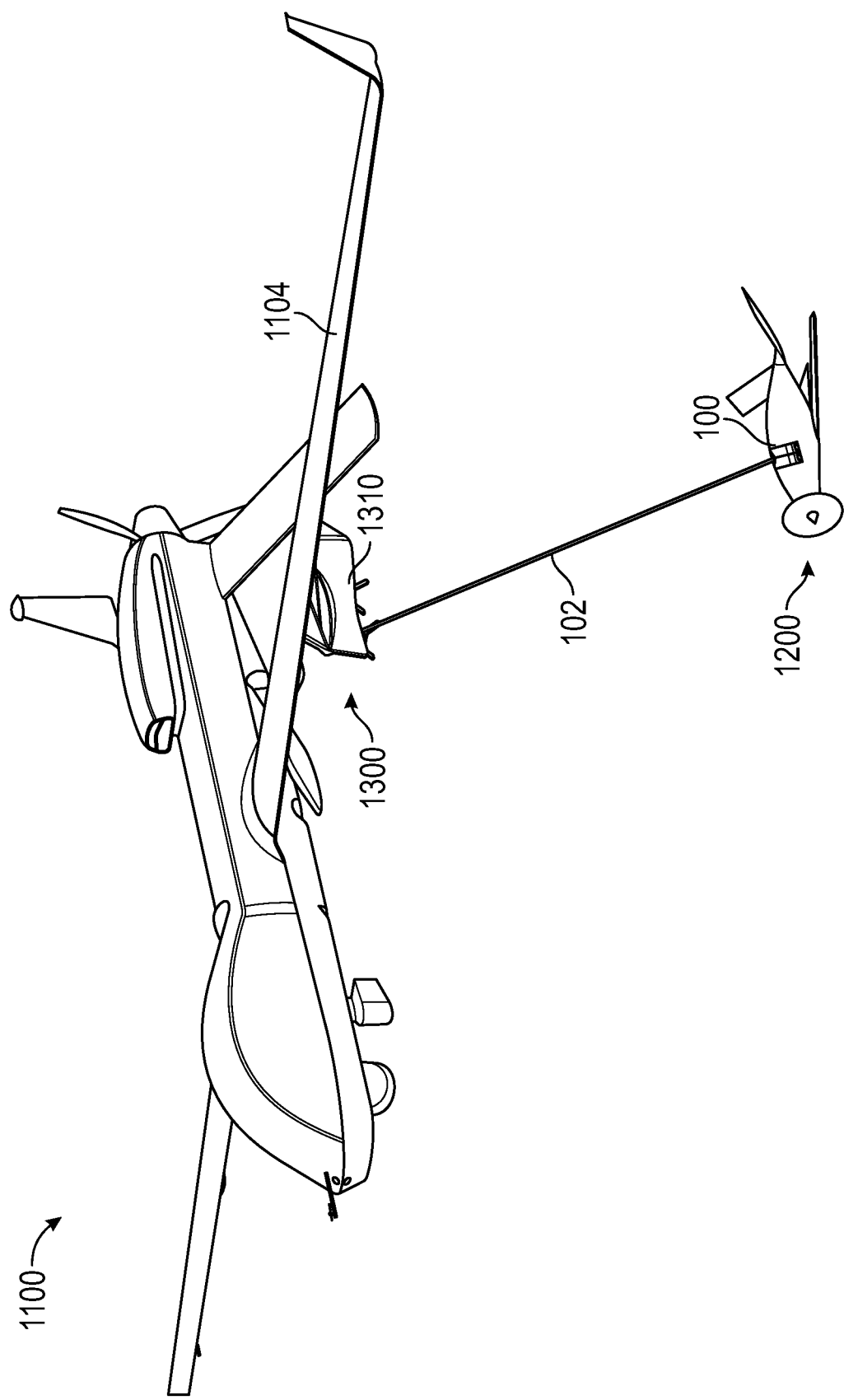
FIG. 10 is a perspective view of the host and target aircrafts of FIGS. 8A-8C showing the host aircraft recovering the target aircraft in flight via a towline extending from one of the hoist systems.

FIG. 10 is a perspective view of the host aircraft 1100 recovering the target aircraft 1200 in flight via the towline 102 extending from the hoist system 1300. The hoist system 1300 includes a pylon 1310 attached to an underside of the left wing 1104. The other hoist systems 1300 are removed for clarity, but other hoist systems on either wing may be included. The pylon 1310 is a supporting structure made of metal, composite, or combinations thereof, that supports and protects the various components of the hoist system 1300, as further described.

Figure 11A:
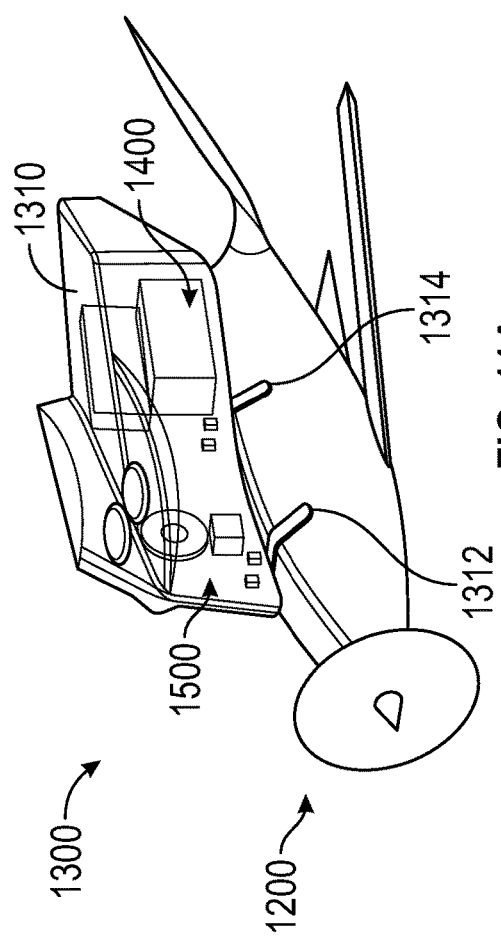
FIGS. 11A-11C are perspective, side and front views, respectively, of the target aircraft secured to the hoist system of FIGS. 8A-8C.
Figure 11C:
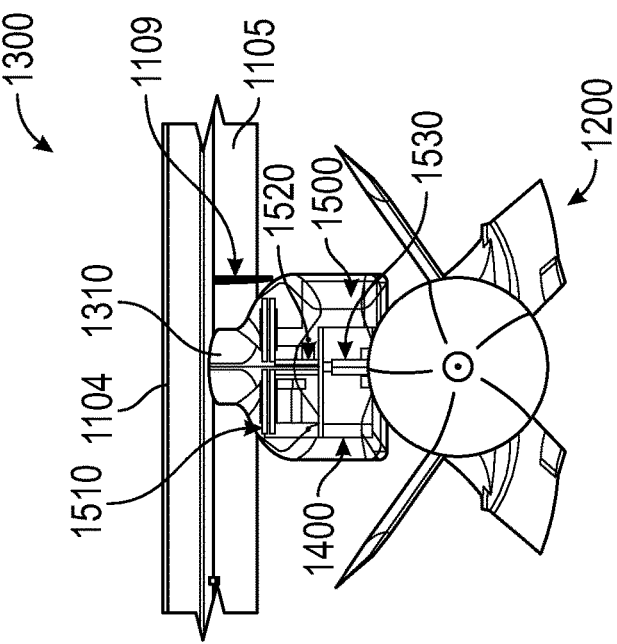
Figure 11B:
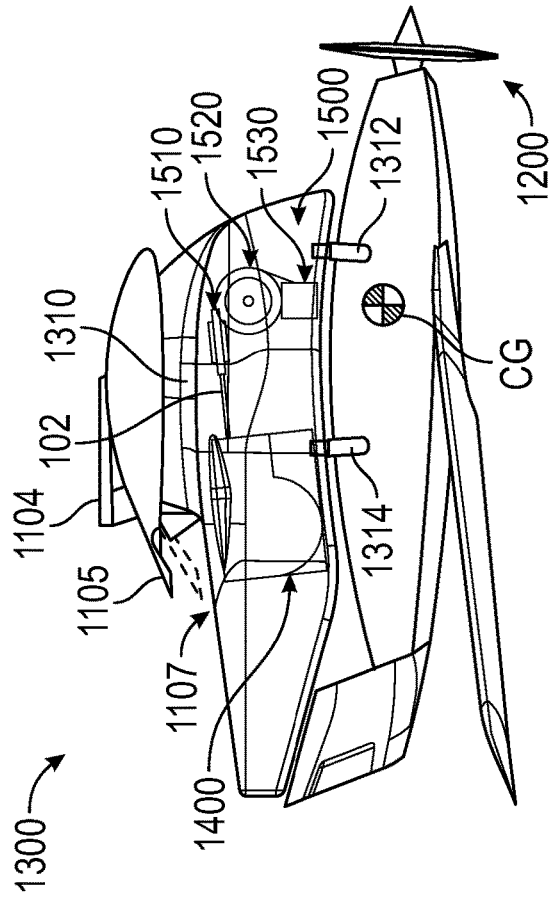

FIGS. 11A-11C are perspective, side, and front views respectively of the hoist system 1300 securing the target aircraft 1200 to the wing 1104. The wing 1104 is removed in FIG. 11A for clarity. The hoist system 1300 may be located to avoid interference with the wing flap 1105 and wing flap hinge 1109. A clearance 1107 may exist between the pylon 1310 and the lowered flap 1105, as shown most clearly in FIG. 11B. The side of the pylon 1310 may avoid interference with the wing flap hinge 1109, as shown in FIG. 11C.

The hoist system 1300 includes forward and aft sway bars 1312, 1314 that extend outward and downward from a bottom end of the pylon 1310. The sway bars 1312 surround an upper portion of the fuselage target aircraft 1200 for lateral stability of the target aircraft 1200 and for ensuring alignment of the target aircraft 1200 during the last phase of reeling in the target aircraft 1200. In some embodiments, the sway bars 1312, 1314 may guide the target aircraft 1200 with stowed wings into position so that a securement mechanism, as further described, may engage with the target aircraft 1200. The pylon 1310 and sway bars 1312, 1314 are further shown in, and described with respect to, FIGS. 12A-12D.

In FIGS. 11A-11C, the pylon 1310 is shown transparently for clarity purposes, to show components of the hoist system 1300 therein. The hoist system 1300 may include a motorized winch 1400. The winch 1400 may be located in an aft section of the pylon 1310 relative to other components of the hoist system 1300. The hoist system 1300 may include a latching system 1500 located forward of the winch 1400. The towline 102 may extend from the winch 1400 to the latching system 1500 and to the target aircraft 1200. The latching system 1500 may guide the towline 102 along a path. There may be a fleet pulley assembly 1510 through the towline 102 extends, a top sheave 1520 along which the towline 102 wraps around down through a latch housing 1530 located beneath the top sheave 1520. Further details of the winch 1400 and latching system 1500 are described herein with respect to FIGS. 13A-14. The target aircraft 1200 may be secured with the hoist system 1300 with the center of gravity CG of the target aircraft 1200 located toward a forward portion of the pylon 1310, as shown. The latch housing 1530 or other engaging features of the hoist system 1300, as described herein, may be located generally above and in line with the center of gravity CG of the target aircraft 1200.

Figure 12A:
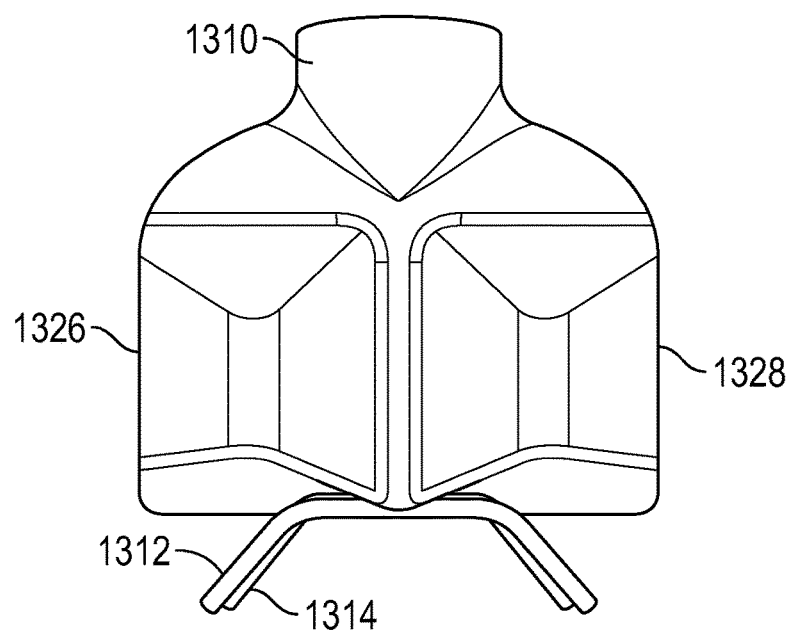
FIGS. 12A-12D are various views of a pylon of the hoist systems of FIGS. 8A-8C.
Figure 12B:
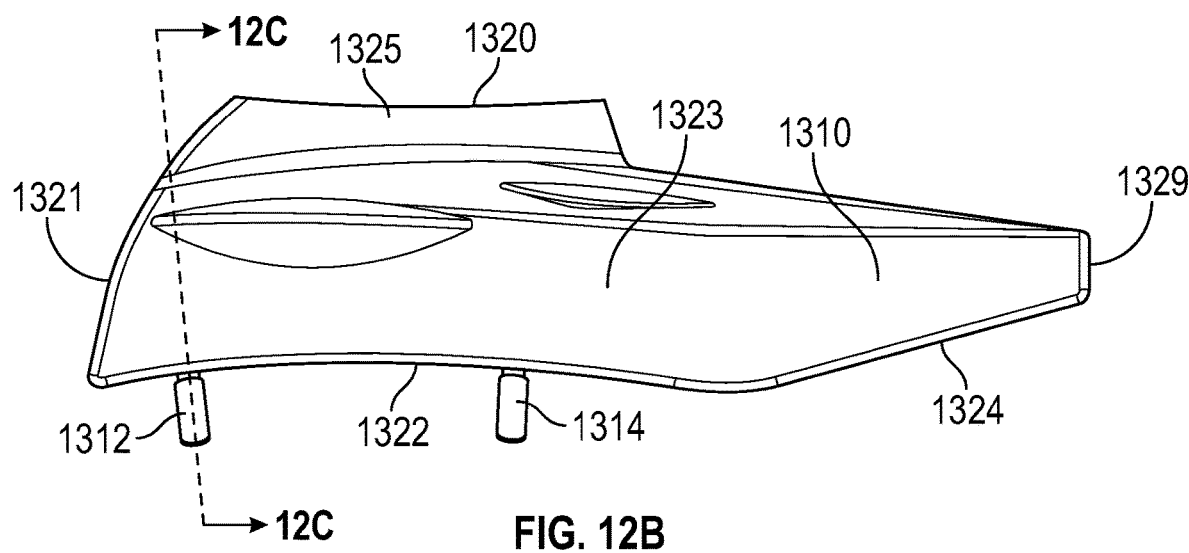
Figure 12C:
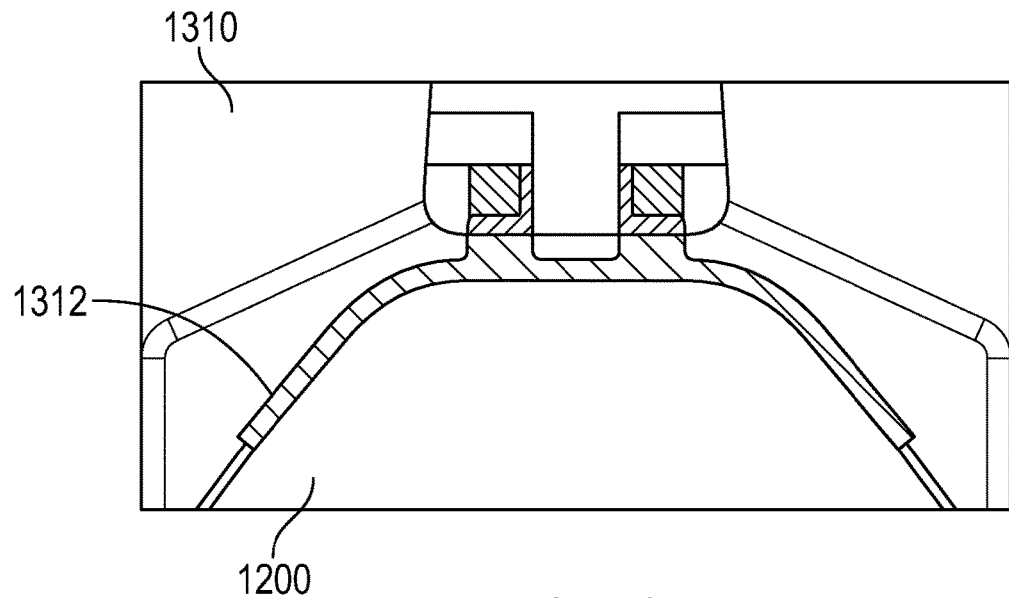
Figure 12D:
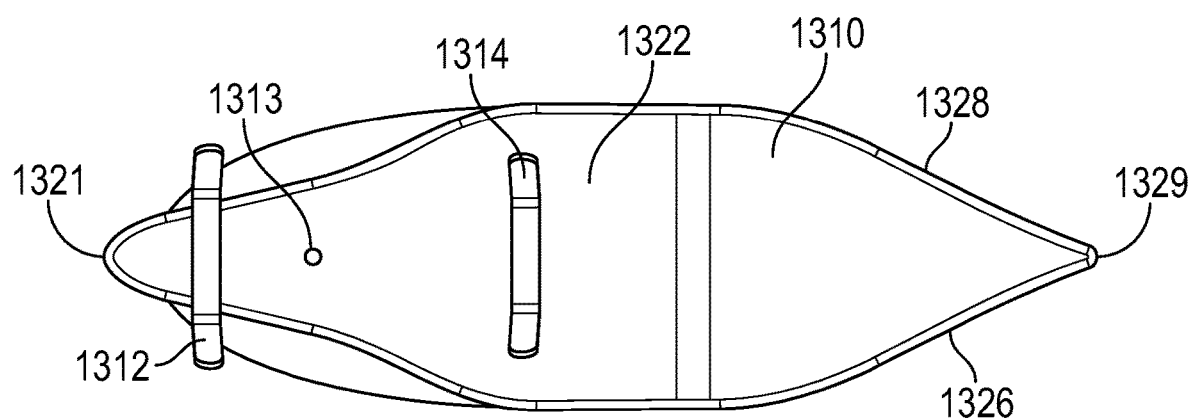

FIGS. 12A-12D are front, side, cross-section, and bottom views of the pylon 1310. FIG. 12C is a cross-section, taken from FIG. 12B along the line 12C-12C, and includes a cross-sectional part of the target aircraft 1200 for illustration. The shape, size, configuration, etc. of the pylon 1310 is merely one example embodiment, and other variations of the pylon may be incorporated.

The pylon 1310 extends from a forward end 1321 to an aft end 1329, each end having tapering profiles for aerodynamic efficiency. Opposing lateral sidewalls 1326, 1328 may increase in width from the forward end 1321 in the aft direction to a central portion 1323, and then decrease in width from the central portion 1323 to the aft end 1329. The sidewalls 1328 may have a maximum width at the central portion 1323, which width may be sized based on size of the hoist system 1300 components therein, based on the width of the stowed target aircraft 1200, and/or based on the configuration of the host aircraft wing 1104 and associated features of the host aircraft 1100. The pylon 1310 may have a length of between 30 and 200 inches (in), between 45 and 90 in, between 55 and 80 in, or between 65 and 70 in. The pylon 1310 may have a width of between 5 and 100 in, between 10 and 50 in, or between 15 and 25 in. The pylon 1310 may have a height of between 5 and 100 in, between 10 and 50 in, or between 15 and 25 in.

The pylon 1310 may include an upper attachment portion 1325 for attaching the pylon 1310 to the wing. The upper attachment portion 1325 may have a smaller width than that between the sidewalls 1326, 1328. There may be an upper side 1320 having a contour that matches that of the underside of the wing. The upper side 1320 may be an upper surface of A gap may exist between the upper side 1320 and the lower side of the wing, or there may not be a gap. The pylon 1310 may include a lower side 1322 having a contour that matches an upper portion of the fuselage of the target aircraft 1200. A gap may or may not exist between the fuselage and the lower side 1322.

The sway bars 1312, 1314 may be located on the lower side 1322 at forward portions of the pylon 1310 as shown, or in other locations. The forward sway bar 1312 may be located at or near a lower portion of the forward edge 1321. The aft sway bar 1314 may be located at or near the central portion 1323 of the pylon 1310. An opening 1313 in the lower side 1322 of the pylon 1310 may be located in between the sway bars 1312, 1314. The towline may extend from the latching system 1550 through the opening 1313 and out to the target aircraft 1200.

As shown in FIG. 12C, the sway bar 1312 may match the contour of the target aircraft 1200 fuselage. The sway bar 1312 may extend along the upper and side surfaces of the upper portion of the target aircraft 1200 fuselage after securing the target aircraft 1200 to the hoist system 1300. Similar relationships may exist for the aft sway bar 1314 and a rearward portion of the fuselage of the target aircraft 1200.

Figure 13A:
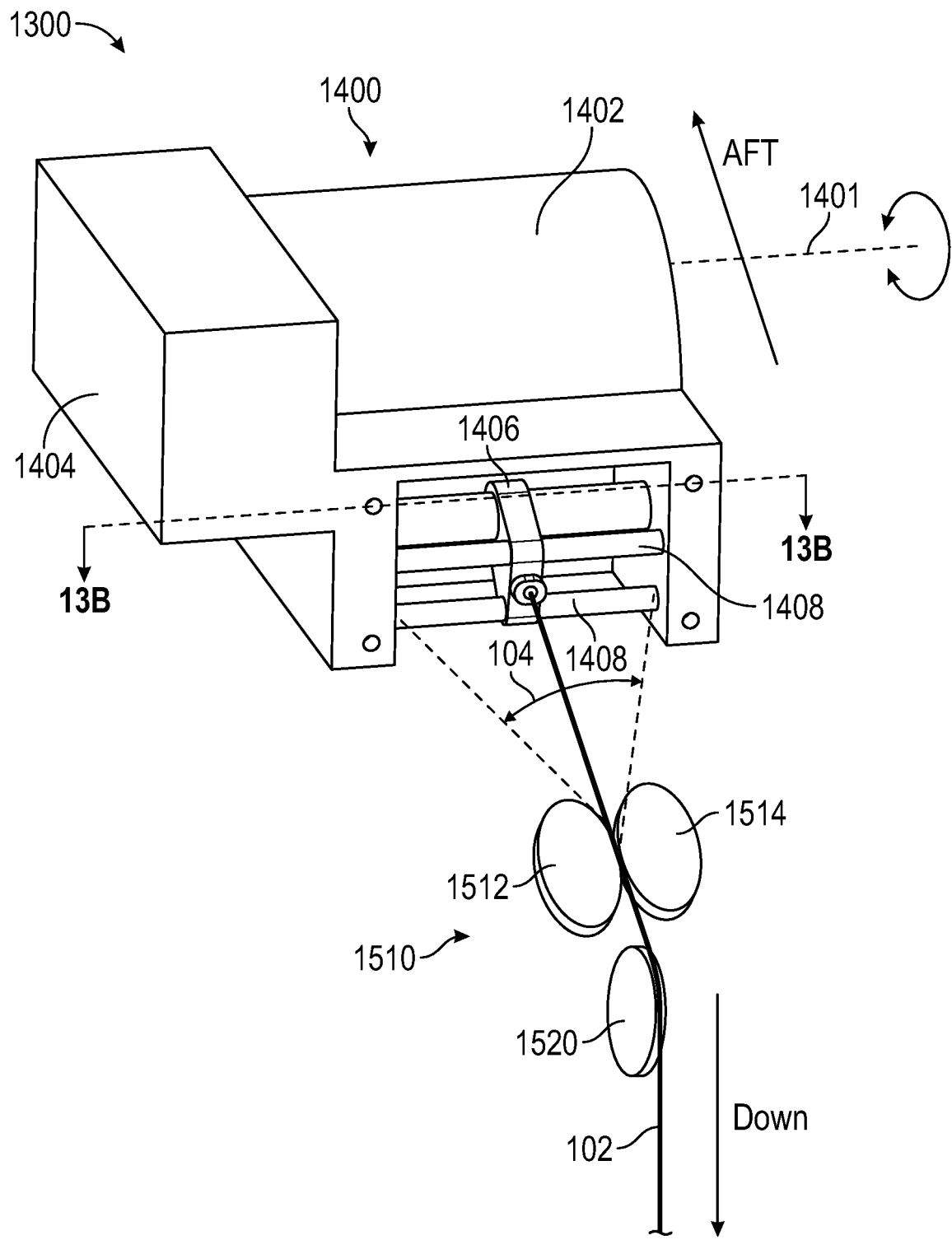
FIGS. 13A and 13B are perspective and cross-section views, respectively, of a motorized winch and pulley/sheave system of the hoist systems of FIGS. 8A-8C.
Figure 13B:
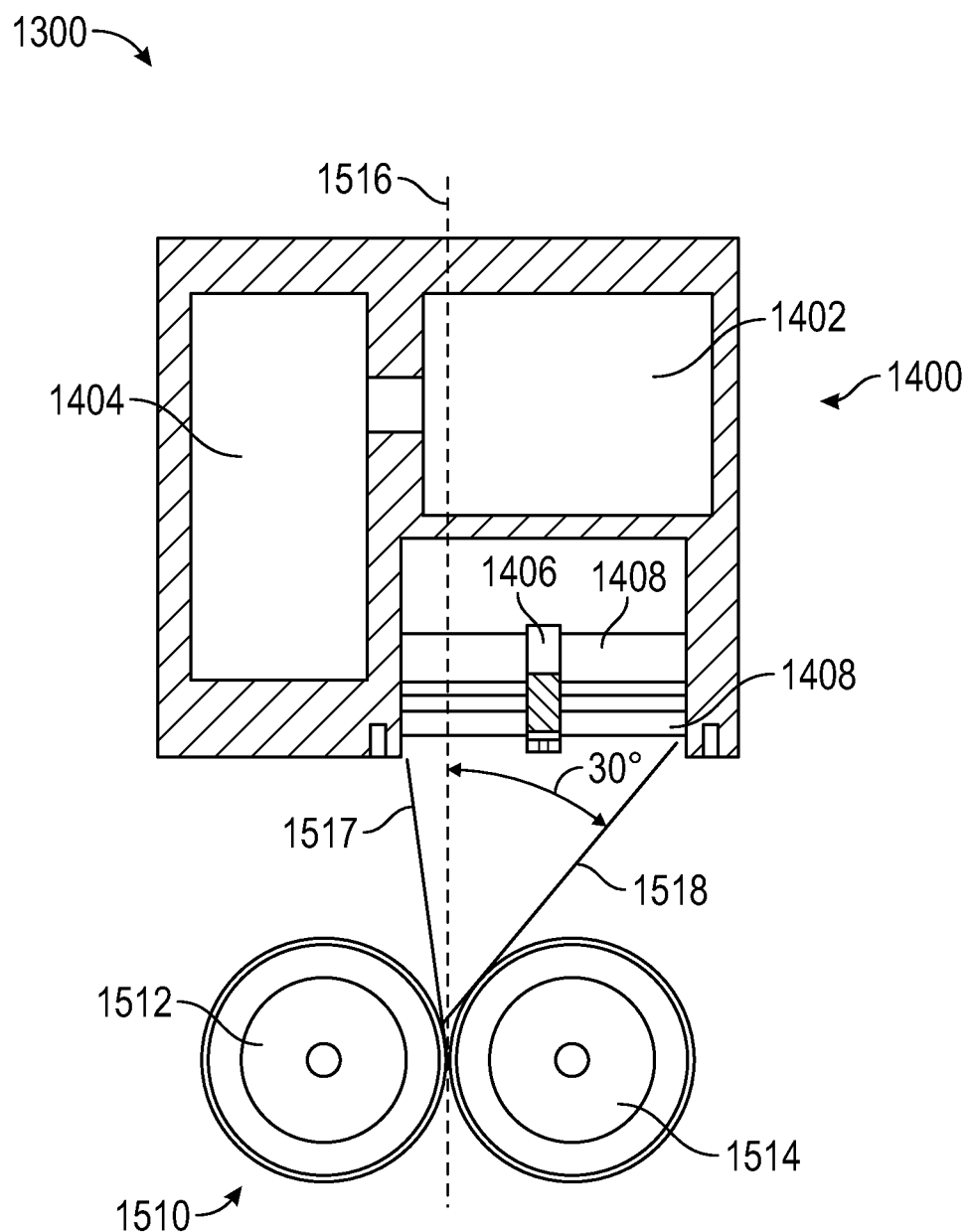

FIG. 13A is a perspective view of a schematic of part of the hoist system 1300, showing the winch 1400, fleet pulley assembly 1510, and top sheave 1520 in isolation from other components. FIG. 13B is a cross-section view taken from FIG. 13A along the line 13B-13B.

The winch 1400 includes a rotating drum 1402 around which the towline 102 is wrapped. The drum 1402 may be cylindrical. A motor 1404 rotates the drum 1402 to control the length of the towline 102 that is paid out from the host aircraft. The motor 1404 may be controlled based on desired length of towline 102, based on speed of paying our or reeling in of the towline 102, based on vertical position of the target aircraft 1200, etc. The winch 1400 may have a width, height and depth no greater than 18 in, 12 in, and 16 in, respectively.

The towline 102 may extend through a movable cartridge 1406 at a forward portion of the winch 1400. The cartridge 1406 may move axially along one or more axles 1408. The cartridge 1406 may move in response to the relative lateral position of the towline 102 on the drum 1402. As the towline 102 unwraps from the drum 1402 to pay out, the towline 102 may extend from various lateral locations of the drum 1402. "Lateral" refers to a direction that is parallel to the axis of rotation 1401 of the drum 1402, which axis may be perpendicular to a longitudinal axis of the host aircraft fuselage 1106.

The cartridge 1406 may move such that the towline 102 portion located between the fleet pulley assembly 1510 and the drum 1402 may sweep out an angle 104 of at least ten degrees, at least twenty degrees, at least thirty degrees, at least forty degrees, at least fifty degrees, at least sixty degrees, at least seventy degrees, at least eighty degrees, or at least ninety degrees. In some embodiments, the angle 104 is sixty degrees or about sixty degrees. In some embodiments, the angle 104 is not symmetric about the towline 102. As shown in FIG. 13B, the fleet pulley assembly 1510 may be located along a geometric reference line 1516 that is optimized for the pylon 1310 geometry. The line 1516 may be selected for example to allow the towline 102 to be at angle of about thirty degrees on one side but less than thirty degrees on the other side of the line 1516. These are just examples and other configurations and angles may be used.

The fleet pulley assembly 1510 may include a first pulley 1512 and a second pulley 1514 oriented generally horizontally and approximately vertically level with the outlet of the towline 102 at the cartridge 1406. The pulleys 1512, 1514 may be wheels rotatable on a central axis and supported by a support structure within the pylon 1310. The fleet pulley assembly 1510 stabilizes the horizontal or lateral direction of the towline away from the cartridge 1406. The pulleys 1512, 1514 may be positioned forward of the winch 1400 to prevent vertical separation of the towline 102 from the groove formed by the opposing pulleys 1512, 1514. In some embodiments, other guides besides pulleys may be used, such as sheaves, stationary and lubricated rounded surfaces, etc. An aft-most portion of the fleet pulley assembly 1510 may be located greater than 5 inches (in), greater than 6 in, greater than 7 in, greater than 8 in, greater than 9 in, or greater than 10 in forward of a forward-most portion of the winch. The sweep angle of the towline 102 may be with respect to this distance between the winch 1400 and fleet pulley assembly 1510. The centers of rotation of the pulleys 1512, 1514 may be located about 9 to 11 in from a forward-most portion of the winch 1400. Each of the pulleys 1512, 1514, and/or the top sheave as further described, may have a diameter between 2 and 12 in, between 4 and 10 in, between 6 and 8 in, or 7 in.

The top sheave 1520 may be located forward of the fleet pulley assembly 1510. The top sheave 1520 may guide the towline 102 in a downward direction as shown. The top sheave 1520 may be a rotating wheel. In some embodiments, the top sheave 1520 may be a stationary guide surface, or other type guide.

FIG. 14A is a perspective view of an embodiment of the latching system 1500. The latching system 1500 may include fewer or more components than shown. The towline 102 wraps around the top sheave 1520 and extends down to a towline connector 1528. The towline connector 1528 may define a channel through which the towline 102 extends. An upper opening of the towline connector 1528 may be located adjacent and below the top sheave 1520 to minimize the amount of towline 102 extending freely between the top sheave 1520 and the upper opening. The towline 102 may exit a lower opening in the towline connector 1528 to extend to the end fitting 103. In some embodiments, the towline 102 may not extend through the towline connector 1528. For example, the towline 102 may connect with the towline connector 1528, which may connect with or be integral to the end fitting 103, as further described.

In some embodiments, the towline connector 1528 may be used to couple the towline 102 with the end fitting 103. In some embodiments, the towline connector 1528 may be integrally formed with the end fitting 103 or may be separately formed and attached to or otherwise coupled with the end fitting 103.

With reference to FIG. 14B, some embodiments of the towline connector 1528 may have a first proximal portion 1531 and a second distal portion 1533 that is coupled with or integrally formed with the first portion 1531. The first portion 1531 may be tapered at a leading or proximal portion 1531a of the first portion 1531. Additionally, a distal section 1531b of the first portion 1531 of the towline connector 1528 may have a round cross-section, as shown, or can have a square cross-section, polygonal cross-section, or have any other suitably shaped cross-section. The second portion 1533 of the towline connector 1528 can have a round cross-section, as shown, or can have a square cross-section, polygonal cross-section, or have any other suitably shaped cross-section. The second portion 1533 can have a cross-sectional size or diameter that is smaller than a cross-sectional size or diameter of the first portion 1531 such that the towline connector 1528 has a shoulder or ledge 1535 that can engage with a latch assembly 1540, as will be described in greater detail below. The first and second portions 1531, 1533 of the towline connector 1528 maybe coaxially aligned along a longitudinal axis of the first and second portions 1531, 1533. The towline connector 1528 may move up and down (or proximally and distally) along with the towline 102 in order to secure with the target aircraft 1200.

In some embodiments, the towline connector 1528 may include a tube with an opening or pin at the lower end thereof configured to secure with a corresponding structure of the target aircraft 1200, e.g. to secure with the capture mechanism 100. In some embodiments, the towline connector may be guided by a bottom sheave (not shown) located below the top sheave 1520 and adjacent to the towline connector 1528. The towline connector 1528 may be guided by the bottom sheave, for example a rotating wheel thereof. In some embodiments, the towline connector 1528 may be guided by a stationary guide or other component.

The latching system 1500 may include a latch housing 1530. The towline connector 1528 may be located partially inside the latch housing 1530. The latch housing 1530 may vertically secure the towline connector 1528, for example by inserting one or more pins or bars through and/or around the adapter. For example, the latch assembly 1540 may be actuated (e.g., advanced and withdrawn in a horizontally axially direction as oriented) to engage and disengage with the towline connector 1528 to vertically secure the towline connector 1528 in place. For example and without limitation, the latch housing 1530 may include the latch assembly 1540 that may move between a first, latched position (as shown in FIG. 14A) wherein the latch assembly 1540 is engaged with the towline connector 1528 so as to prevent any outfeed (e.g. movement vertically downward away from the latching system 1500) of the towline 102 and a second, unlatched position (not shown) wherein the latch assembly 1540 is axially withdrawn (e.g. leftward as oriented in the figure) and is disengaged from the towline connector 102 so that the towline 102 can be fed out (e.g. move vertically downward away from the latching system 1500). The latch assembly 1540 may move within a channel or passageway within the latch housing 1530. In some embodiments, the latch assembly 1540 or a pin thereof may be spring-loaded. A spring may bias the latch assembly 1540 into the locked position as shown. The latch assembly 1540, whether spring-loaded or otherwise, may be actuated in response to receiving the tow connector, which may be automatic, performed by a control system of the latching system, or actuated by a remote operator.

In some embodiments, the latch assembly 1540 may have a main body portion 1541 and a distal portion 1542. The distal portion 1542 may have a recess or opening 1544 formed therein that maybe sized and configured to receive the second portion 1533 of the towline connector 1533 (e.g., may fit around an outside surface of the second portion 1533 of the towline connector 1533). The recess or opening 1544 formed in the distal portion 1542 maybe sized and configured to prevent the first portion 1531 of the towline connector 1533 from sliding therethrough such that, when the latch assembly 1540 is in the first, latched position (as shown in FIG. 14A), the shoulder 1535 of the towline connector 1528 maybe abutted against the distal portion 1542 of the latch assembly 1540. In some embodiments, the distal portion 1542 of the latch assembly 1540 can have an angled or beveled lower surface configured to cause the latch assembly 1340 to axially move or withdraw toward the unlatched position when the towline connector 1528 is reeled in (i.e., withdrawn) and forced into contact with the beveled lower surface of the latch assembly 1540. In this arrangement, the latch assembly 1540 can be caused to automatically move to the unlatched position when the towline connector 1528 is reeled in and forced into contact with the beveled lower surface of the latch assembly 1540. In some embodiments, the latch assembly 1540 may include a pin extending outwardly away from the body 1541 which extends through the towline connector 1528. Therefore, a variety of different latching connections may be implemented.

In some embodiments, the latching system 1500 may include a cutter assembly 1542. The cutter assembly 1542 may be configured to cut the towline 102. The cutter assembly 1542 may include a blade, edge, knife, rotating saw, or other sharp edge to sever the towline 102. The towline 102 may be cut in case of emergency where the target aircraft 1200 must be cut loose from the host aircraft 1100, for instance if the winch 1400 or other mechanism has failed during recovery operations.

Any portion of any of the steps, processes, structures, and/or devices disclosed or illustrated in one example in this disclosure may be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described may be incorporated in the example methods and processes. For example, one or more additional operations may be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems may generally be integrated together in a single product or packaged into multiple products. Additionally, some implementations are within the scope of this disclosure.

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that may be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but may encompass structures that are reasonably close approximations.

Conditional language, such as "may," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" may refer to something that departs from exactly parallel by less than or equal to 20°. All ranges are inclusive of endpoints.

Several illustrative examples of towlines and related systems and methods have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps may be arranged or performed differently than described and components, elements, features, acts, or steps may be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations may also be implemented in combination in a single implementation. Conversely, various features that are described in the context of a single implementation also may be implemented in multiple implementations separately or in any suitable subcombination. Moreover, although features may be described above as acting in certain combinations, one or more features from a claimed combination may in some cases be excised from the combination, and the combination may be claimed as a subcombination or variation of a subcombination.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures may or may not be drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components may be added, removed, and/or rearranged. Further, the disclosure herein of any particular feature, aspect, method, property, characteristic, quality, attribute, element, or the like in connection with various examples may be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures. or description herein. For example, various functionalities provided by the illustrated modules may be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification may be included in any example.

In summary, various examples of towlines and related systems and methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples may be combined with, or substituted for, one another. Accordingly, the scope of this disclosure should not be limited by the particular disclosed examples described above, but should be determined only by a fair reading of the claims.

What is claimed is:

1. A system for recovery of a target aircraft by a host aircraft during forward flight, the system comprising:
    a towline comprising a proximal section configured to be coupled with the host aircraft and a distal section configured to be paid out from the host aircraft;
    a fitting coupled with the distal section of the towline; and
    a capture mechanism comprising a first movable portion and a second movable portion configured to be coupled with a fuselage of the target aircraft;
    wherein:
        the first movable portion of the capture mechanism is configured to move from a first position to a second position in which the first movable portion extends away from the fuselage of the target aircraft,
        the second movable portion of the capture mechanism is configured to move from a first position to a second position in which the second movable portion extends at an angle away from the fuselage of the target aircraft,
        the capture mechanism is configured to receive the towline in an opening defined by the first and second movable portions in the second positions and to permit vertical movement of the towline through the opening, and
        the capture mechanism is configured to prevent the fitting attached to the towline from moving vertically through the opening.

2. The system of claim 1, wherein, in the first position, the first and second movable portions are positioned near the fuselage, in line with the fuselage, or against the fuselage of the target aircraft.

3. The system of claim 1, wherein the first and second movable portions are configured to move to a capture position, or return to respective first positions, to secure the target aircraft to the towline.

4. The system of claim 1, wherein the opening is smaller than a maximum cross-sectional size of the fitting.

5. The system of claim 1, wherein the first movable portion and the second movable portion are configured to rotate between the respective first and second positions.

6. The system of claim 1, wherein the first movable portion of the capture mechanism is configured to move independent of the position of the second movable portion.

7. The system of claim 1, wherein the first movable portion is integral with or rigidly attached to the second movable portion such that the first and second movable portions move together as one unit between the first and second positions.

8. The system of claim 1, wherein the capture mechanism is configured to receive the towline in the opening with the distal section of the towline oriented less than 30 degrees off a vertical direction.

9. The system of claim 1, wherein the host aircraft comprises a system for securing a target aircraft to a host aircraft, the system comprising:
    a winch configured to be supported by a wing of the host aircraft and to have a deployable towline carried by the winch;
    one or more fleet pulleys, the towline configured to extend from the winch through the one or more fleet pulleys;
    an upper sheave, the towline configured to extend from the fleet pulley to the upper sheave; and
    a towline connector, the towline configured to extend below the aircraft and be reeled in by the winch to secure the target aircraft with the host aircraft.

10. A system for recovery of a target aircraft by a host aircraft during forward flight, the system comprising:
    a wing root region defined by an intersection of a wing and a fuselage of the target aircraft, the wing root region configured to receive from the host aircraft a towline having a fitting;
    one or more flaps configured to be moveably coupled with the fuselage; and
    one or more actuators configured to deploy the one or more flaps to a deployed position away from the fuselage, wherein the one or more flaps define an opening configured to receive the towline therein, such that the fitting contacts the one or more flaps in response to relative vertical movement between the towline and the one or more flaps in the deployed position, and the one or more actuators are further configured to stow the one or more flaps to a stowed position to secure the fitting and towline with the target aircraft.

11. The system of claim 10, wherein, in the stowed position, the one or more flaps form an outer surface of the fuselage.

12. The capture mechanism of claim 10, wherein the one or more flaps comprise a first flap and a second flap.

13. The capture mechanism of claim 12, wherein the first and second flaps are independently movable.

14. The capture mechanism of claim 10, wherein the fitting has a width greater than a width of the opening defined by the one or more flaps.

15. The capture mechanism of claim 10, wherein the one or more flaps are configured to prevent the fitting from moving in an upward direction relative to the one or more flaps when the fitting has been moved into contact with the one or more flaps.

16. The system of claim 10, wherein the one or more flaps are configured to receive the towline in the opening with at least part of the towline adjacent the fitting oriented less than 30 degrees off the vertical direction.

17. A method of recovering a target aircraft with a host aircraft during forward flight, the method comprising:
    extending from the host aircraft a towline having a fitting;
    positioning the towline within a wing root region of the target aircraft with at least part of the towline oriented less than 30 degrees off a vertical direction;

deploying one or more flaps from a fuselage of the target aircraft;

positioning the towline within an opening defined by the one or more flaps in the deployed position;

causing relative vertical movement between the one or more flaps and the towline to move the fitting near the one or more flaps; and stowing the one or more flaps with the fuselage to secure the target aircraft to the towline.

18. The method of claim 17, further comprising retracting the towline into the host aircraft to move the target aircraft toward the host aircraft.

19. The method of claim 17, wherein deploying the one or more flaps comprises deploying a first flap and a second flap.

20. The method of claim 19, wherein the first and second flaps are deployed independently of each other.

\* \* \* \* \*

UNITED STATES PATENT AND TRADEMARK OFFICE
CERTIFICATE OF CORRECTION

| | |
|---|---|
| PATENT NO. | : 11,639,223 B1 |
| APPLICATION NO. | : 17/455383 |
| DATED | : May 2, 2023 |
| INVENTOR(S) | : Allwein et al. |

It is certified that error appears in the above-identified patent and that said Letters Patent is hereby corrected as shown below:

In the Specification

Column 11, Line 35-36, delete "The target aircraft T may have a weight of between".

Column 17, Line 36, delete "21" and insert -- 2I --.

Column 31, Line 3, delete "figures." and insert -- figures --.

In the Claims

Column 32, Line 46, Claim 12, delete "capture mechanism" and insert -- system --.

Column 32, Line 48, Claim 13, delete "capture mechanism" and insert -- system --.

Column 32, Line 50, Claim 14, delete "capture mechanism" and insert -- system --.

Column 32, Line 53, Claim 15, delete "capture mechanism" and insert -- system --.

Signed and Sealed this
First Day of August, 2023

Katherine Kelly Vidal
*Director of the United States Patent and Trademark Office*